United States Patent
Hong et al.

(10) Patent No.: US 11,561,299 B1
(45) Date of Patent: Jan. 24, 2023

(54) SYSTEM AND METHOD FOR MULTI-WAVEFORM RADAR TRACKING

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 0 days.

(21) Appl. No.: 17/832,278

(22) Filed: Jun. 3, 2022

(51) Int. Cl.
| | | |
|---|---|---|
| *G01S 13/72* | (2006.01) | |
| *G01S 13/58* | (2006.01) | |
| *G01S 7/282* | (2006.01) | |
| *G01S 13/931* | (2020.01) | |
| *G01S 7/35* | (2006.01) | |
| *G01S 7/285* | (2006.01) | |

(52) U.S. Cl.
CPC .............. *G01S 13/72* (2013.01); *G01S 13/58* (2013.01); *G01S 7/282* (2013.01); *G01S 7/285* (2013.01); *G01S 7/352* (2013.01); *G01S 13/931* (2013.01)

(58) Field of Classification Search
CPC ...... G01S 13/931; G01S 7/032; G01S 13/343; G01S 13/584; G01S 13/87; G01S 7/35; G01S 13/42; G01S 7/03; G01S 7/356; G01S 7/352; G01S 7/354; G01S 13/003; G01S 13/536; G01S 7/282; G01S 7/285; G01S 7/023; G01S 13/106; G01S 13/10; G01S 13/76; G01S 7/28; G01S 7/4815; H01Q 25/00; H04B 7/0413; H04B 7/0691
See application file for complete search history.

(56) References Cited

U.S. PATENT DOCUMENTS

| | | |
|---|---|---|
| 3,691,560 A | 9/1972 | Hammack |
| 3,978,482 A | 8/1976 | Williams et al. |
| 4,042,927 A | 8/1977 | Helms |
| 4,084,158 A | 4/1978 | Slawsby |
| 4,246,585 A | 1/1981 | Mailloux |
| 4,544,927 A | 10/1985 | Kurth et al. |

(Continued)

FOREIGN PATENT DOCUMENTS

| | | |
|---|---|---|
| CN | 206515399 U | 9/2017 |
| EP | 3816665 A1 | 5/2021 |

(Continued)

OTHER PUBLICATIONS

Chen, Qingchao, et al., "A coherent through-wall MIMO phased array imaging radar based on time-duplexed switching", Proceedings of SPIE, SPIE Defense + Security, 2017, Anaheim, California, United States.

(Continued)

*Primary Examiner* — Olumide Ajibade Akonai
(74) *Attorney, Agent, or Firm* — Christopher P. Maiorana, PC

(57) ABSTRACT

A system for radar tracking, preferably including one or more transmitter elements, receiver elements, and signal processors, and optionally including one or more velocity sensing modules. A method for radar tracking, preferably including transmitting probe signals, receiving reflected probe signals, and/or tracking environmental targets, and optionally including decoding the set of received probe signals. The method is preferably implemented using a radar system, but can additionally or alternatively be implemented using any other suitable wave-based detection system.

20 Claims, 16 Drawing Sheets

(56) References Cited

U.S. PATENT DOCUMENTS

| | | | |
|---|---|---|---|
| 4,546,355 | A | 10/1985 | Boles |
| 4,717,916 | A | 1/1988 | Adams et al. |
| 4,723,124 | A | 2/1988 | Boles |
| 4,794,395 | A | 12/1988 | Cindrich et al. |
| 4,996,532 | A | 2/1991 | Kirimoto et al. |
| 5,218,359 | A | 6/1993 | Minamisono |
| 5,225,839 | A | 7/1993 | Okurowski et al. |
| 5,278,757 | A | 1/1994 | Hoctor et al. |
| 5,847,673 | A | 12/1998 | Debell |
| 5,945,926 | A | 8/1999 | Ammar et al. |
| 7,535,409 | B1 | 5/2009 | Choe et al. |
| 7,609,198 | B2 | 10/2009 | Chang |
| 8,269,137 | B2 | 9/2012 | Ehrmann et al. |
| 8,312,771 | B2 | 11/2012 | Randall et al. |
| 8,482,455 | B2 | 7/2013 | Kemkemian et al. |
| 9,103,671 | B1 | 8/2015 | Breed et al. |
| 9,470,782 | B2 | 10/2016 | Millar et al. |
| 9,541,638 | B2 | 1/2017 | Jansen et al. |
| 9,869,762 | B1 | 1/2018 | Alland et al. |
| 10,048,366 | B1 | 8/2018 | Hong et al. |
| 10,359,512 | B1 | 7/2019 | Hong et al. |
| 10,509,119 | B2 | 12/2019 | Hong et al. |
| 2002/0180636 | A1 | 12/2002 | Lin et al. |
| 2004/0178951 | A1 | 9/2004 | Ponsford et al. |
| 2007/0013575 | A1 | 1/2007 | Lee et al. |
| 2007/0285315 | A1 | 12/2007 | Davis et al. |
| 2008/0122681 | A1 | 5/2008 | Shirakawa |
| 2008/0159416 | A1 | 7/2008 | Melick et al. |
| 2008/0250875 | A1 | 10/2008 | Khosla et al. |
| 2008/0291077 | A1 | 11/2008 | Chang |
| 2009/0135046 | A1 | 5/2009 | Steele et al. |
| 2009/0174590 | A1 | 7/2009 | Huizing et al. |
| 2009/0201206 | A1 | 8/2009 | Li et al. |
| 2009/0231181 | A1 | 9/2009 | Yannone |
| 2010/0019954 | A1 | 1/2010 | Mizutani et al. |
| 2010/0156701 | A1 | 6/2010 | Shirakawa |
| 2010/0194629 | A1 | 8/2010 | Craig et al. |
| 2010/0220001 | A1 | 9/2010 | Longstaff |
| 2010/0328157 | A1 | 12/2010 | Culkin et al. |
| 2011/0050500 | A1 | 3/2011 | Shirakawa |
| 2011/0241928 | A1 | 10/2011 | Oswald et al. |
| 2011/0298676 | A1 | 12/2011 | Yanagihara et al. |
| 2012/0001791 | A1 | 1/2012 | Wintermantel |
| 2012/0112954 | A1 | 5/2012 | Kurono et al. |
| 2012/0268309 | A1 | 10/2012 | Samuel et al. |
| 2012/0299773 | A1 | 11/2012 | Stirling-Gallacher et al. |
| 2013/0069818 | A1 | 3/2013 | Shirakawa et al. |
| 2013/0120191 | A1 | 5/2013 | Zhang et al. |
| 2013/0300596 | A1 | 11/2013 | Shirakawa |
| 2014/0197984 | A1 | 7/2014 | Wang et al. |
| 2014/0266898 | A1 | 9/2014 | Linnenbrink |
| 2015/0102954 | A1 | 4/2015 | Hong |
| 2015/0270609 | A1 | 9/2015 | Jin |
| 2016/0069994 | A1 | 3/2016 | Allen et al. |
| 2016/0291130 | A1 | 10/2016 | Ginsburg et al. |
| 2017/0031013 | A1 | 2/2017 | Halbert et al. |
| 2017/0082730 | A1 | 3/2017 | Kishigami et al. |
| 2017/0141454 | A1 | 5/2017 | Welle |
| 2017/0212213 | A1 | 7/2017 | Kishigami |
| 2017/0315229 | A1 | 11/2017 | Pavek et al. |
| 2018/0024235 | A1 | 1/2018 | Hong et al. |
| 2018/0088224 | A1 | 3/2018 | Kishigami |
| 2018/0224980 | A1* | 8/2018 | Avila ................. G01S 13/88 |
| 2019/0018128 | A1 | 1/2019 | Shollenberger |
| 2019/0097651 | A1* | 3/2019 | Nayyar ............. H03M 13/00 |
| 2019/0212430 | A1 | 7/2019 | Akamine et al. |
| 2019/0265347 | A1 | 8/2019 | Wintermantel |
| 2019/0293755 | A1* | 9/2019 | Cohen ................ G01S 7/295 |
| 2019/0293784 | A1* | 9/2019 | Khalid ............. G01S 13/343 |
| 2019/0293787 | A1 | 9/2019 | Sakai et al. |
| 2019/0324133 | A1 | 10/2019 | Hong et al. |
| 2019/0339374 | A1 | 11/2019 | Kageme et al. |
| 2019/0386712 | A1 | 12/2019 | Fang |
| 2020/0025914 | A1 | 1/2020 | Li et al. |
| 2020/0081110 | A1 | 3/2020 | Nam et al. |
| 2020/0191930 | A1 | 6/2020 | Yunck |
| 2020/0191939 | A1 | 6/2020 | Wu et al. |
| 2020/0191940 | A1 | 6/2020 | Wu et al. |
| 2020/0200892 | A1 | 6/2020 | Rajab et al. |
| 2020/0337589 | A1* | 10/2020 | Schrattenecker ...... G01S 13/89 |
| 2020/0386854 | A1* | 12/2020 | Melzer ................ G01S 7/35 |
| 2021/0302560 | A1* | 9/2021 | Kishigami ......... G01S 13/5246 |

FOREIGN PATENT DOCUMENTS

| | | |
|---|---|---|
| JP | 2008292264 A | 12/2008 |
| JP | 2013068433 A | 4/2013 |
| JP | 2016217976 A | 12/2016 |
| JP | 2020159848 A | 10/2020 |
| WO | 2019215734 A1 | 11/2019 |

OTHER PUBLICATIONS

Gonzalez, Hector A., et al., "Doppler Ambiguity Resolution for Binary-Phase-Modulated MIMO FMCW Radars, 2019 International Radar Conference, Sep. 23-27, 2019."

Holder, Martin, et al., "Real-Time Graph SLAM based on Radar", IEEE Intelligent Vehicles Symposium (IV), Paris, France, Jun. 9-12, 2019.

Hott, Maurice, et al., "Joint Super-Resolution and Array Interpolation for MIMO Radar Virtual Arrays", Proceedings of the 15th European Radar Conference, Sep. 26-28, 2018, Madrid, Spain.

Kellner, Dominik, et al., "Instantaneous Ego-Motion Estimation using Multiple Doppler Radars", 2014 IEEE International Conference on Robotics & Automation (ICRA) Hong Kong Convention and Exhibition Center May 31-Jun. 7, 2014, Hong Kong, China.

Li, et al., "Target Tracking in Uncertain Multipath Environment using Distributed Angle-of-Arrival Observation", retrieved from online on Apr. 4, 201 (Apr. 4, 2018); retrieved from URL:http://ieeexplore.ieee.org/document/7131228.

Lupfer, Stefanie, et al., "Increasing FastSLAM Accuracy for Radar Data by Integrating the Doppler Information", 2017 IEEE MIT-S International Conference on Microwaves for Intelligent Mobility (ICMIM).

Rapp, Matthias, et al., "A Fast Probabilistic Ego-Motion Estimation Framework for Radak", 2015 European Conference on Mobile Robotics.

Sun, Hongbo, et al., "Analysis and Comparison of MIMO Radar Waveforms", 2014 International Radar Conference, Oct. 13-17, 2014.

* cited by examiner

SYSTEM AND METHOD FOR MULTI-WAVEFORM RADAR TRACKING

TECHNICAL FIELD

This invention relates generally to the radar field, and more specifically to a new and useful system and method for radar tracking.

FIGURES SA-5B and 6A-6F are schematic representations of various examples of a set of array groupings.

Figure 7:
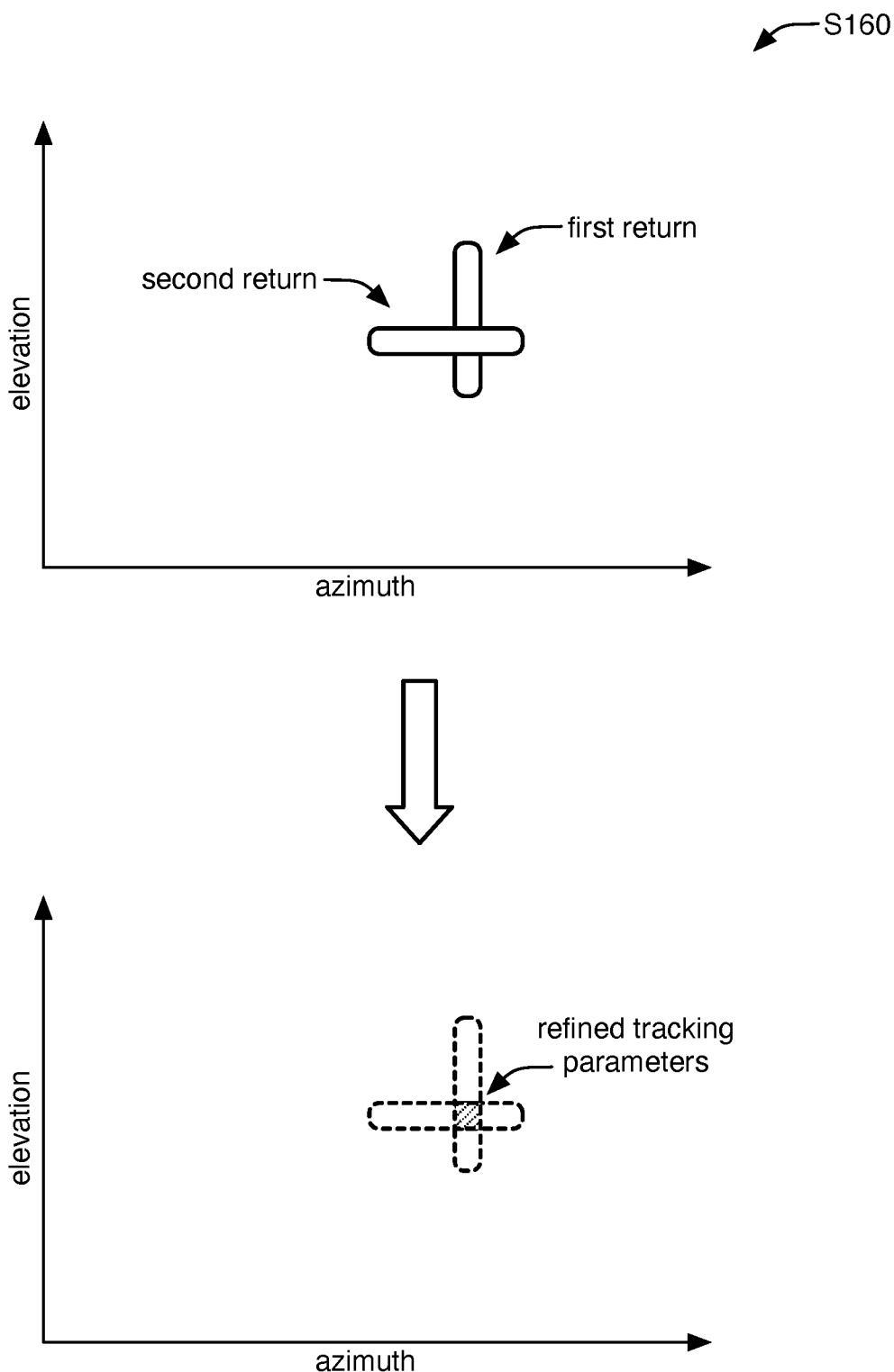

FIG. 7 is a schematic representation of determining refined tracking parameters.

Figure 8A:
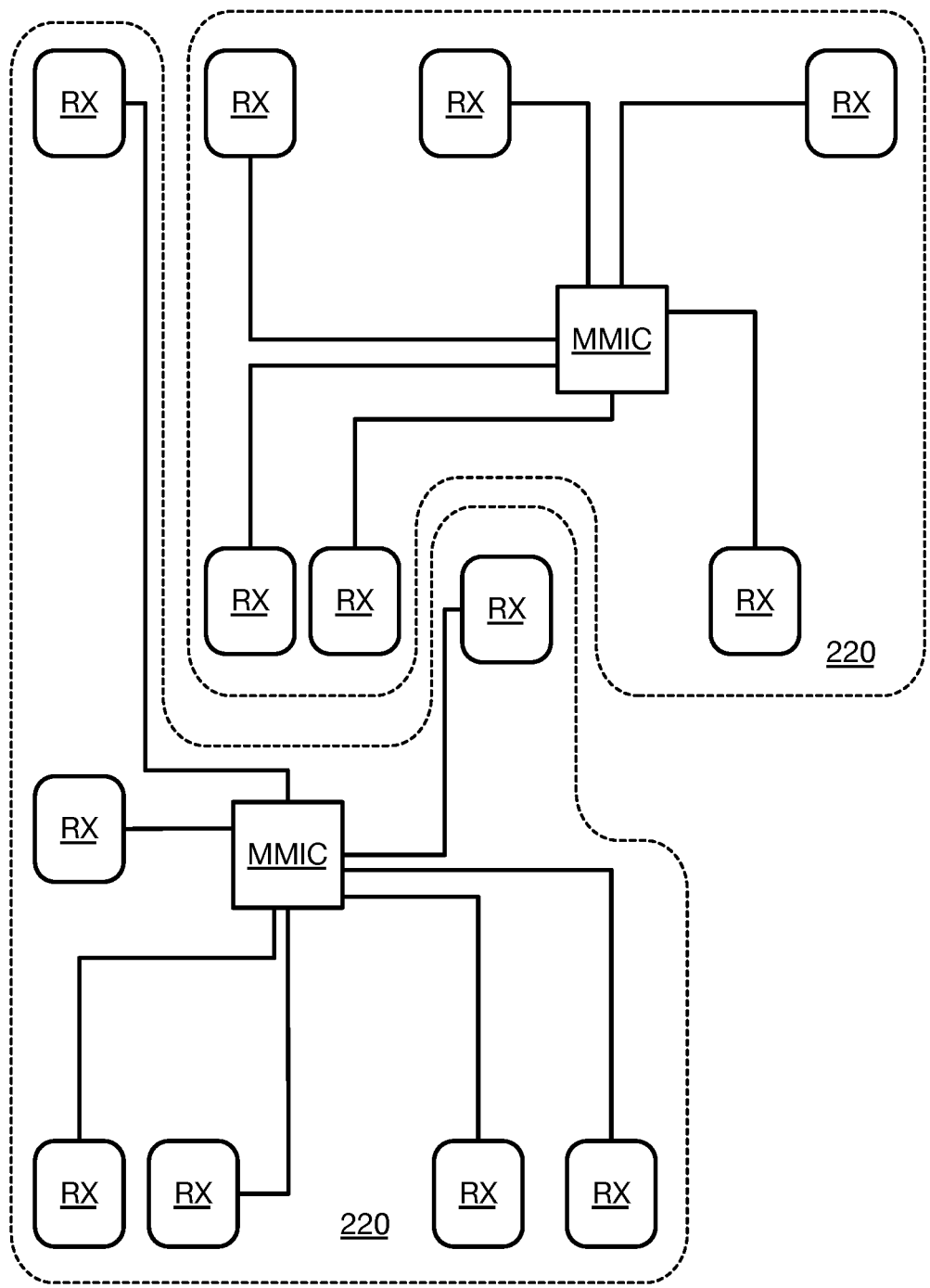
Figure 8B:
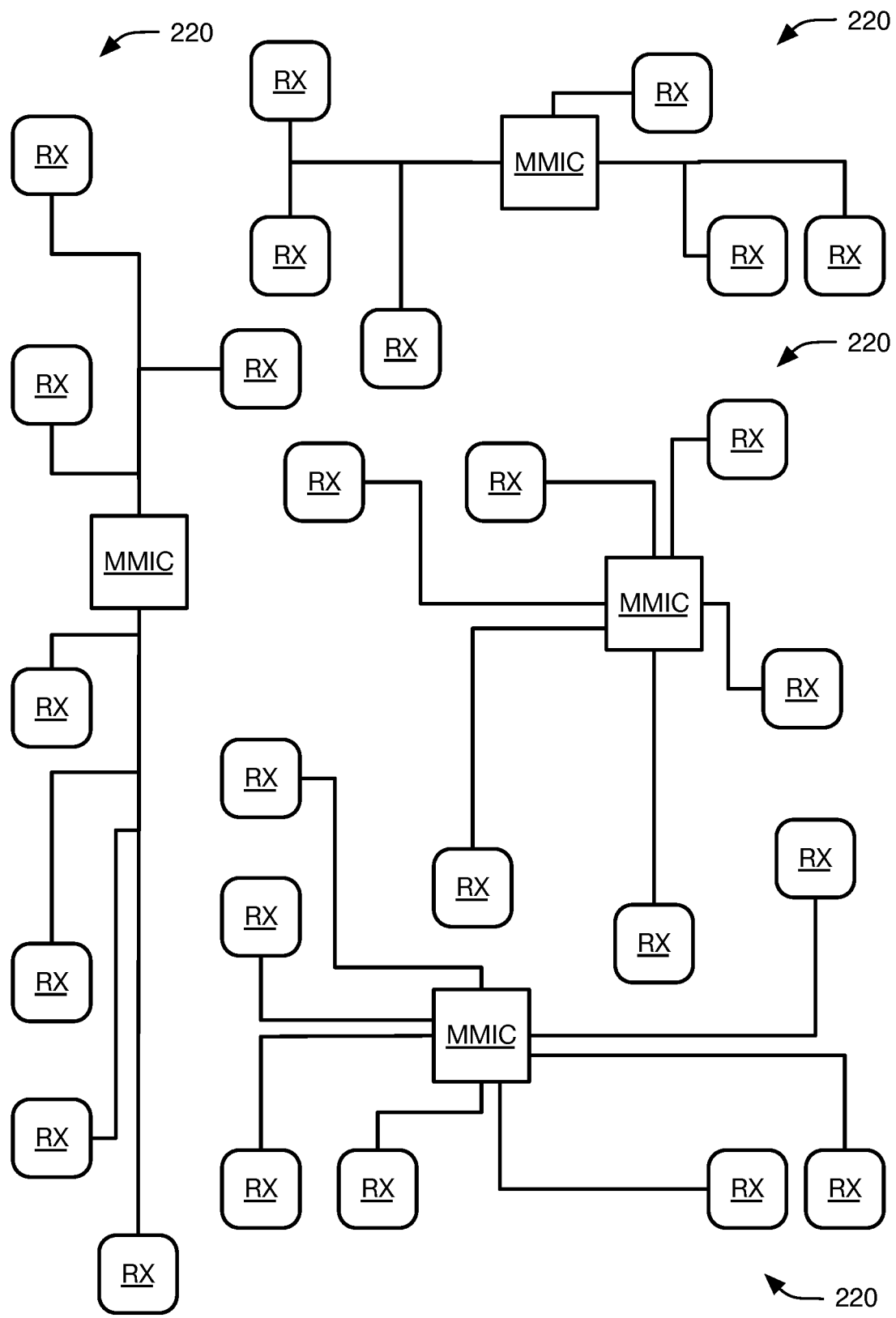
Figure 9A:
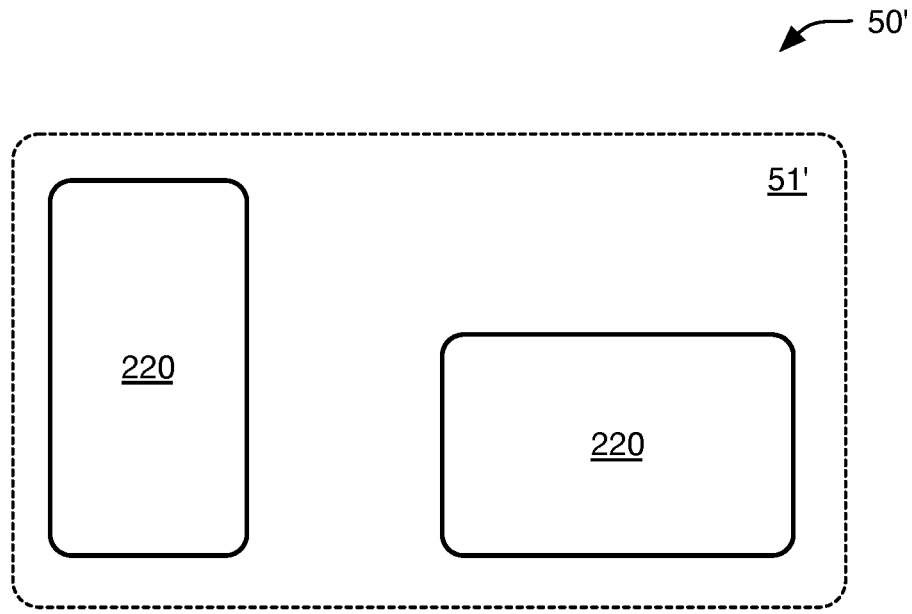
Figure 9B:
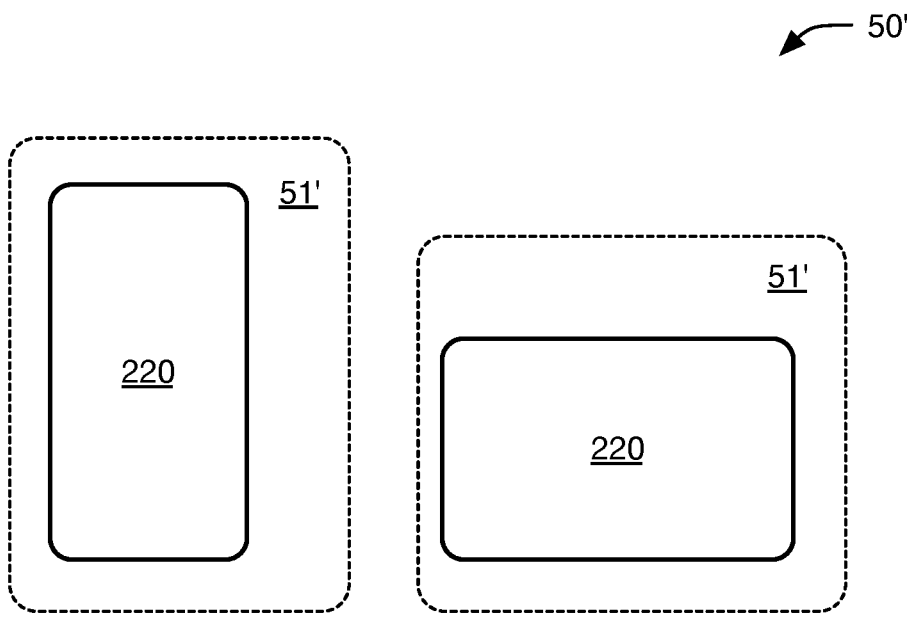
Figure 10A:
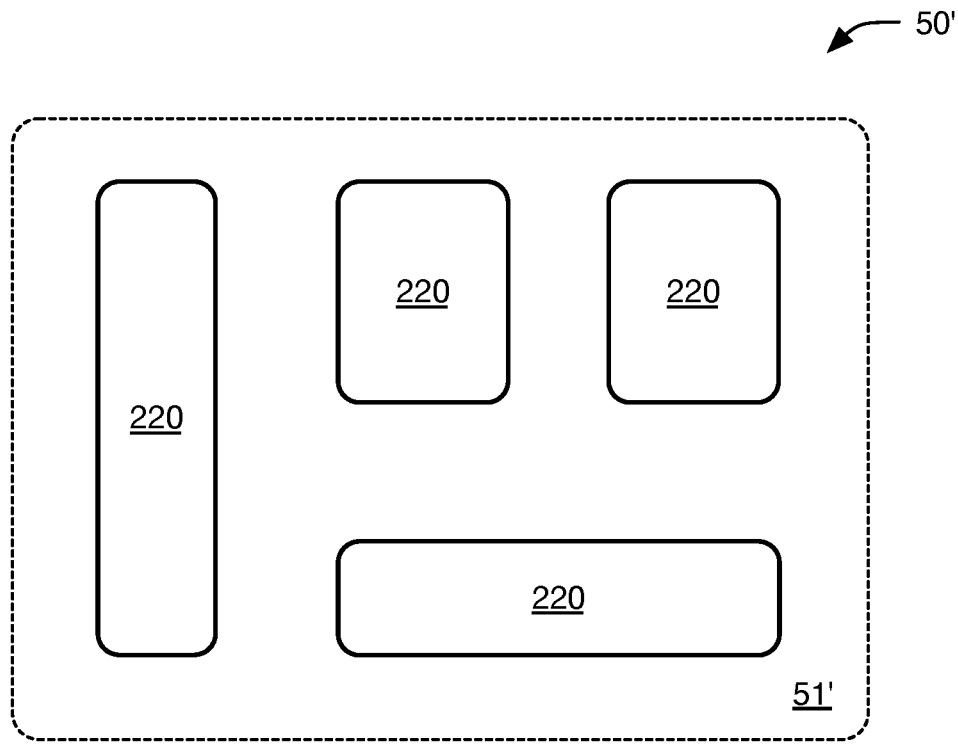
Figure 10B:
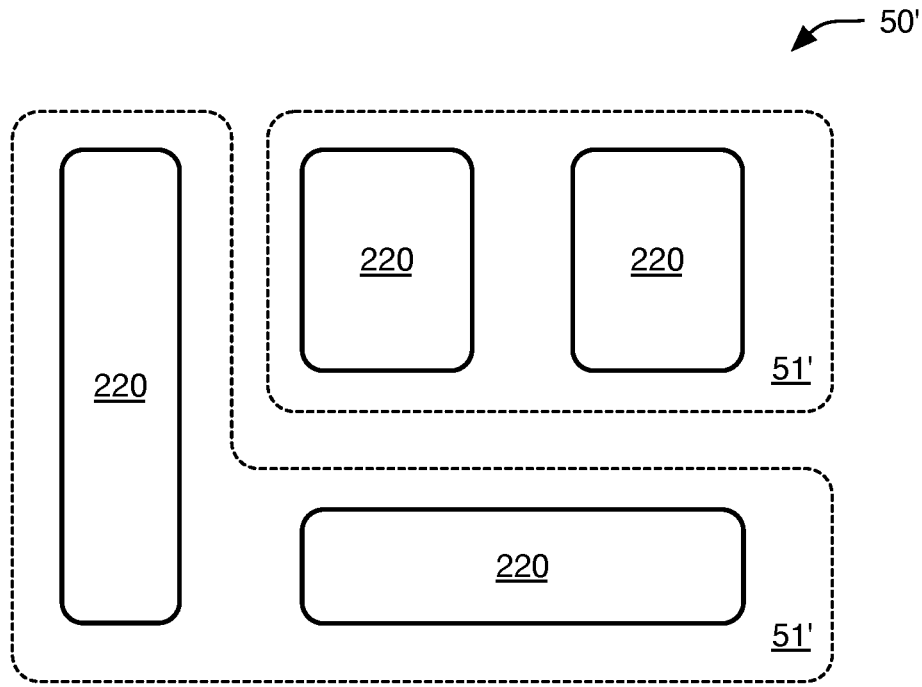
Figure 10C:
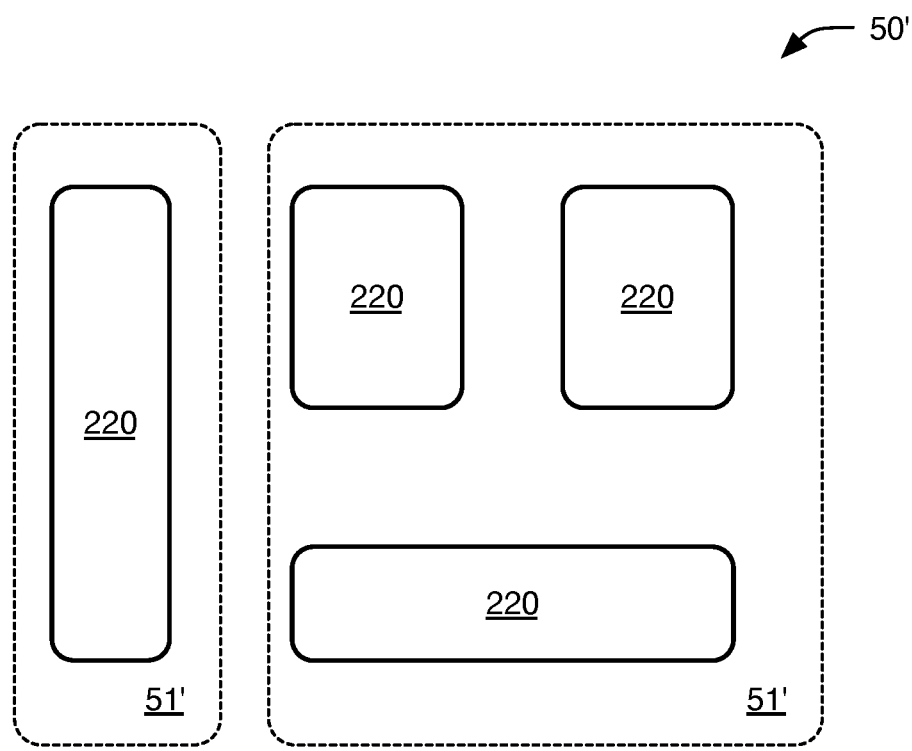
Figure 10D:
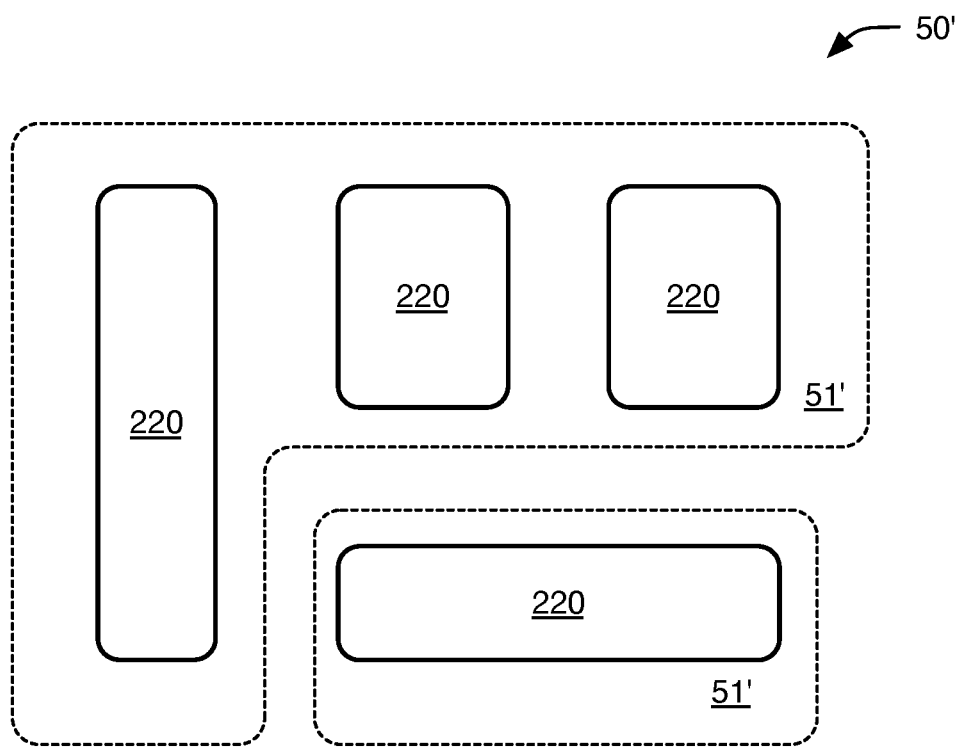
Figure 10E:
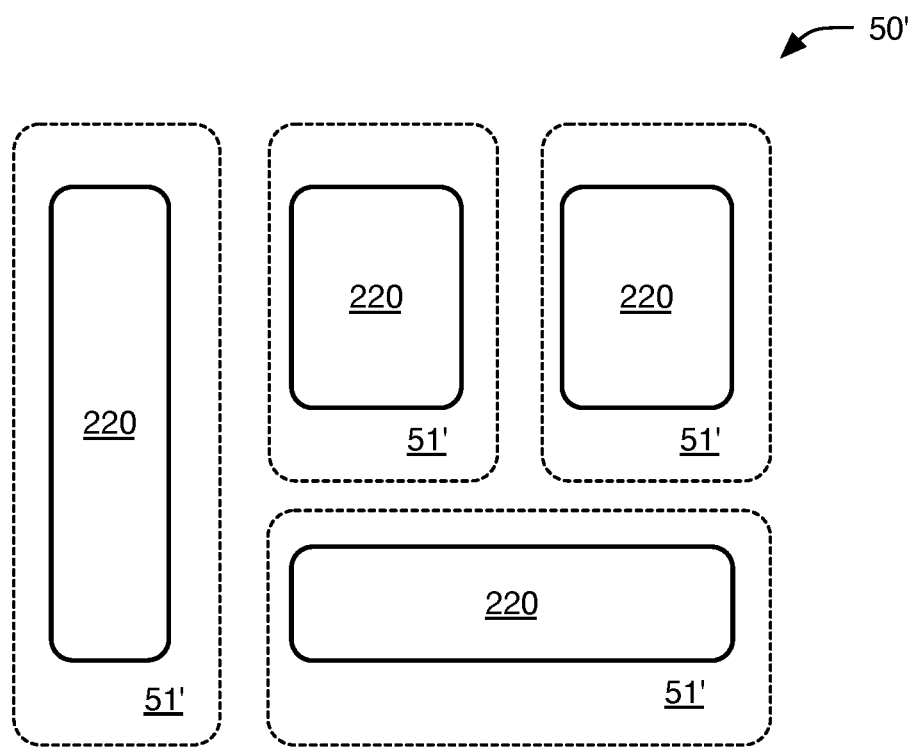
Figure 10F:
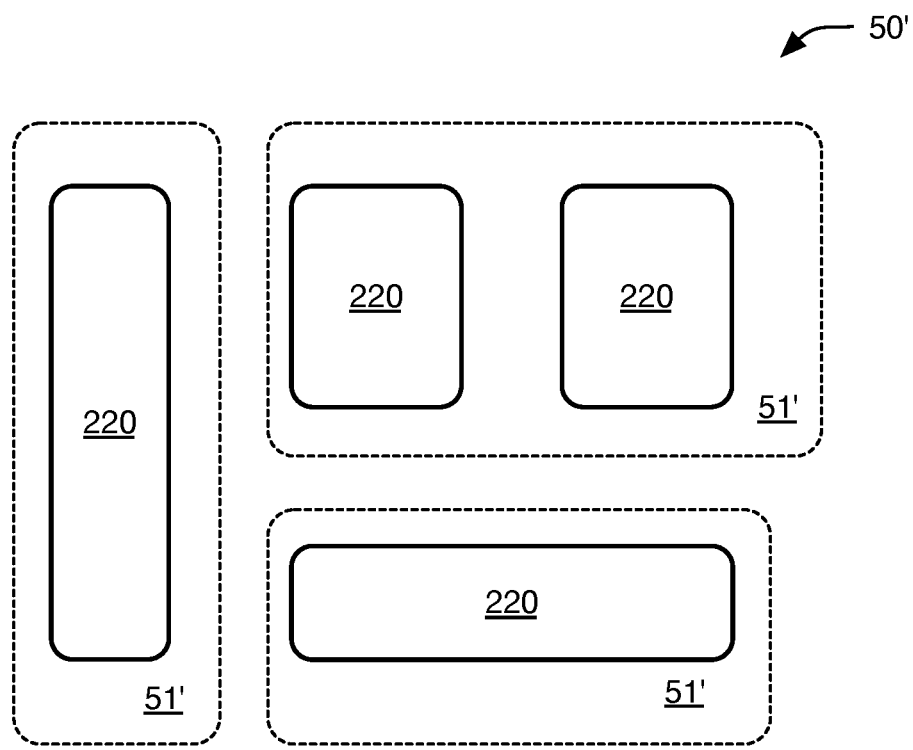

FIGS. 8A-8B are schematic representations of first and second specific examples, respectively, of receiver arrays of the system.

FIGS. 9A-9B and 10A-10F are schematic representations of various examples of a set of receiver array groupings.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2A:
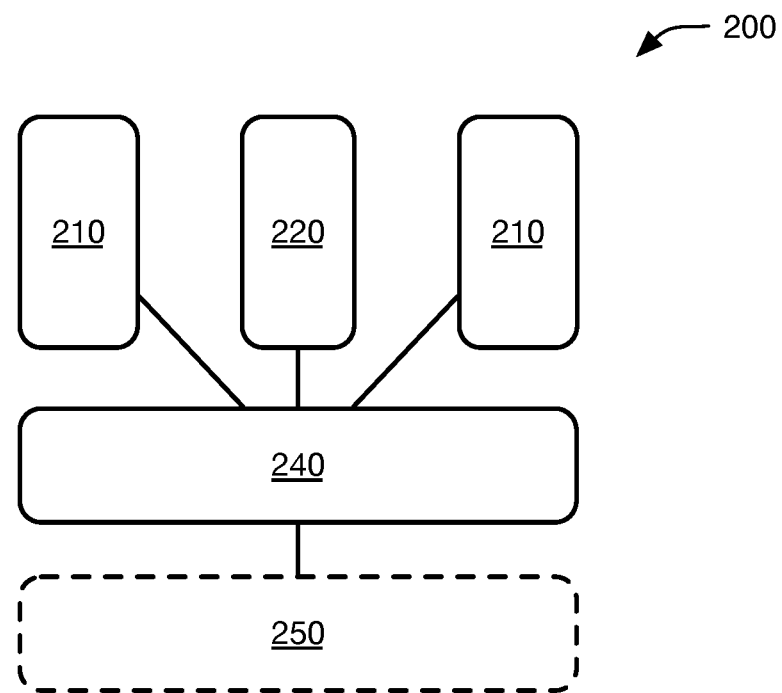
FIG. 2A is a schematic representation of an embodiment of a system for radar tracking.
Figure 2B:
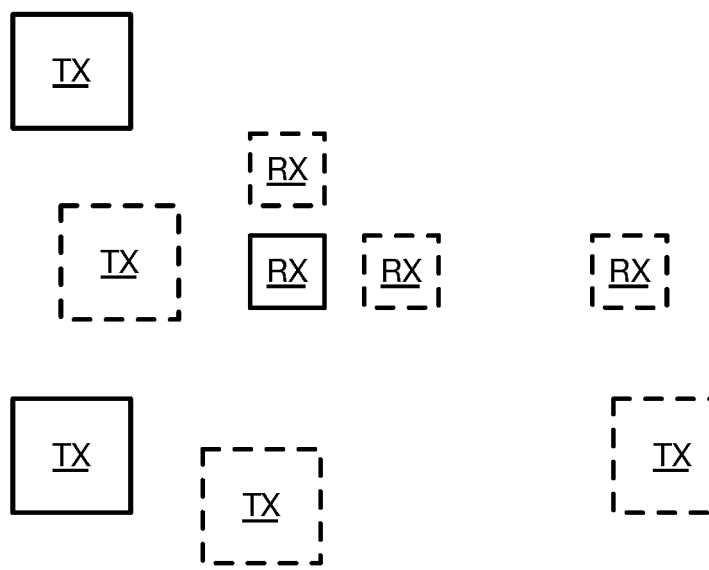
FIG. 2B is a schematic representation of an example of transmitter and receiver arrays of the system.

A system 200 for radar tracking preferably includes one or more: transmitter elements (e.g., defining one or more transmitter arrays 210), receiver elements (e.g., defining one or more receiver arrays 220), and signal processors 240 (e.g., as shown by way of examples in FIGS. 2A-2B). The system 200 can additionally or alternatively include one or more velocity sensing modules 250 and/or any other suitable elements. The system 200 is preferably configured and/or operable to perform the method 200 described below, but can additionally or alternatively be configured in any other suitable manner.

Figure 1:
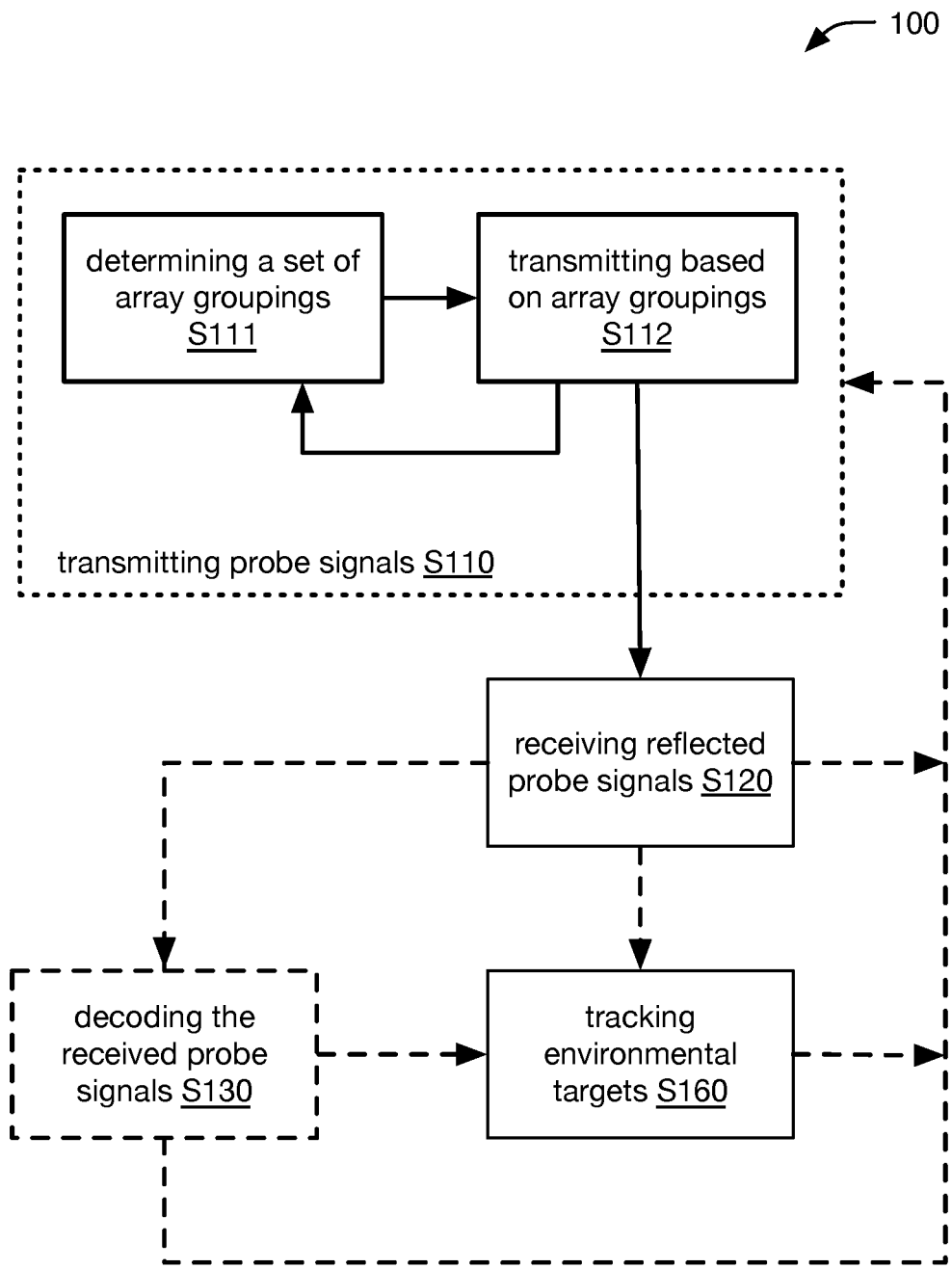
FIG. 1 is a schematic representation of an embodiment of a method for radar tracking.

A method 100 for radar tracking preferably includes: transmitting probe signals S110, receiving reflected probe signals S120, and/or tracking environmental targets S160 (e.g., as shown in FIG. 1). The method can additionally or alternatively include decoding the set of received probe signals S130 and/or any other suitable elements. The method 100 is preferably implemented using a radar system (e.g., the system 200 described herein), but can additionally or alternatively be implemented using any other suitable wave-based detection system (e.g., sonar system, lidar system, etc.).

2. Benefits.

Embodiments of the system and/or method may confer one or more benefits. For example, in some embodiments, independent transmission from multiple groups of elements (e.g., from multiple transmitter arrays and/or groups thereof) can confer one or more benefits.

In some examples, this can enable cross-checking between the different groups, thereby facilitating a feasible path to using low detection thresholds (e.g., while enabling filtering of the false signals typically associated with such low thresholds).

Additionally or alternatively, in some examples, this can enable the reduction of grating sidelobes (and/or the deleterious effects thereof) that may arise from using more transmitter elements coherently (e.g., arising from generation of information associated with virtual array elements, possibly including interpolated array elements, such as described by way of example in U.S. patent application Ser. No. 17/556,221, filed 20 Dec. 2021 and titled "SYSTEMS AND METHODS FOR INTERPOLATED VIRTUAL APERATURE RADAR TRACKING", which is herein incorporated in its entirety by this reference). However, such independent (e.g., incoherent) transmission can additionally or alternatively confer any other suitable benefits.

Additionally or alternatively, in some examples, the use of both numerous smaller groups of elements and less numerous larger groups of elements (e.g., a single group including all transmitter elements of the system) can enable cross-checking and/or hybrid target detection across multiple transmissions (e.g., multiple frames) transmitted at different times (e.g., consecutive frames), which may enable superior detection and/or tracking of targets in the environment surrounding the system.

However, embodiments of the system and/or method can additionally or alternatively confer any other suitable benefits.

3. System.

As described above, the system 200 preferably includes one or more transmitter elements (e.g., defining one or more transmitter arrays 210), receiver elements (e.g., defining one or more receiver arrays 220), and signal processors 240 (e.g., as shown by way of examples in FIGS. 2A-2B). The system 200 can additionally or alternatively include one or more velocity sensing modules 250 and/or any other suitable elements. In some examples, the system 200 includes one or more elements such as described in U.S. patent application Ser. No. 16/704,409, filed 5 Dec. 2019 and titled "SYSTEMS AND METHODS FOR INTERPOLATED VIRTUAL APERTURE RADAR TRACKING", U.S. patent application Ser. No. 17/125,122, filed 17 Dec. 2020 and titled "SYSTEMS AND METHODS FOR PHASE-MODULATED RADAR DETECTION", U.S. patent application Ser. No. 17/117,960, filed 10 Dec. 2020 and titled "SYSTEMS AND METHODS FOR VIRTUAL DOPPLER AND/OR APERTURE ENHANCEMENT", and/or U.S. patent application Ser. No. 17/670,330, filed 11 Feb. 2022 and titled "SYSTEM AND METHOD FOR RADAR INTERFERENCE MITIGATION", each of which is herein incorporated in its entirety by this reference (e.g., such as described regarding the system 200 of U.S. patent application Ser. No. 16/704,409, U.S. patent application Ser. No. 17/125,122, U.S. patent application Ser. No. 17/117,960, and/or U.S. patent application Ser. No. 17/670,330). In some examples, the system implements advanced 'A.I.' techniques that can greatly enhance radar performance, as compared with comparable hardware (e.g., hardware having similar complexity, bill of materials, and/or cost, etc.) implementing more traditional radar techniques.

Each transmitter array 210 preferably functions to transmit a signal that, after reflection by a target, can provide information about the target (e.g., relative location, velocity, etc.). The transmitter array 210 preferably transmits a frequency shift keyed (FSK) RADAR signal or a frequency-modified continuous wave (FMCW) RADAR signal, but the transmitter array 210 can additionally or alternatively transmit other electromagnetic signals (e.g., radio waves for RADAR; infrared, visible, and/or UV waves for LIDAR; etc.), sound signals (e.g., for SONAR), and/or any other suitable signals.

Each transmitter array 210 preferably includes a plurality of transmitter elements (e.g., transmitter antennas). These elements can include: a single transmitter paired to multiple antennas, such as antennas spaced in a particular pattern and/or with antennas coupled to phase shifters and/or time delays; multiple transmitters, each paired to a single antenna; multiple transmitters, some or all paired to multiple antennas (e.g., as described above regarding the single transmitter), with the remaining transmitters preferably each paired to a single antenna; and/or any other suitable transmitter configurations. For example, a transmitter 210 may include transmitter elements spaced by a distances substantially greater (e.g., greater by more than a threshold factor, such as more than 2, 2.5, 3, 4, 5, or 10 times greater) than a distance between receiver elements (e.g., distance between closest receiver elements, average distance between neighboring receiver elements, etc.).

One or more of the transmitter elements (preferably each transmitter element of the system) can include (e.g., be associated with) one or more phase control elements. In some embodiments, the phase control elements include one or more phase inverters (e.g., configured to controllably impose a 180° phase shift on a transmitter signal). The phase control elements can additionally or alternatively include one or more phase shifters (e.g., configured to control a phase shift imposed on the transmitter signal within a phase shifter range, such as 5°, 10°, 30°, 90°, or 180°, etc.). Although the phase shifter is preferably configured to impose phase shifts substantially independent of frequency, the phase control elements can additionally or alternatively include delay elements (e.g., delay lines) and/or any other suitable elements that impose a frequency-dependent phase shift. Additionally or alternatively, the phase control elements can include elements configured to change one or more aspects of the signal driving the transmitter, such as chirp bandwidth, start and/or end frequency (e.g., lowest or highest frequency of a chirp), idle time, and/or any other suitable aspects (e.g., aspects that will result in a phase shift).

Figure 3A:
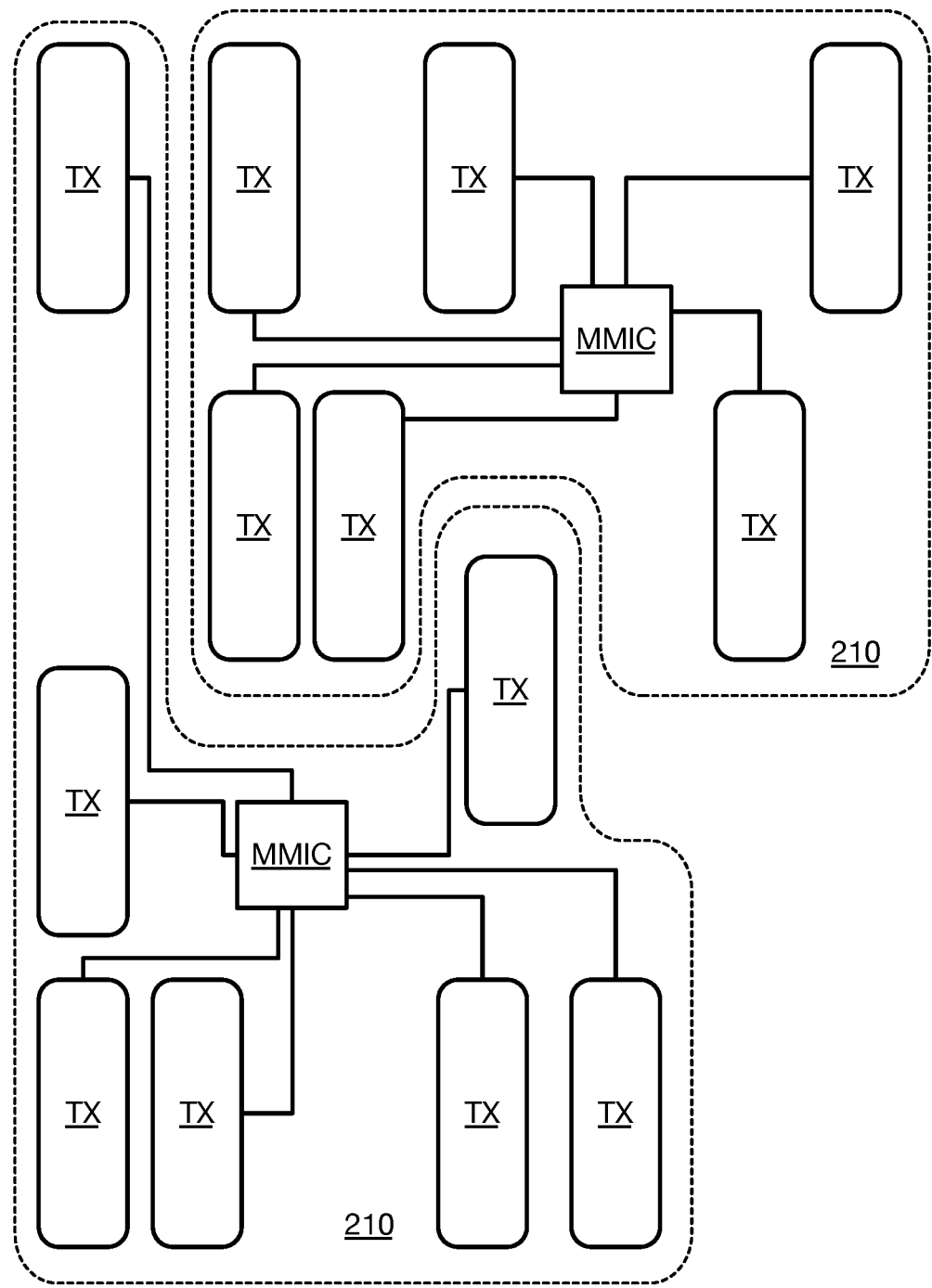
FIGS. 3A-3B are schematic representations of first and second specific examples, respectively, of transmitter arrays of the system.
Figure 3B:
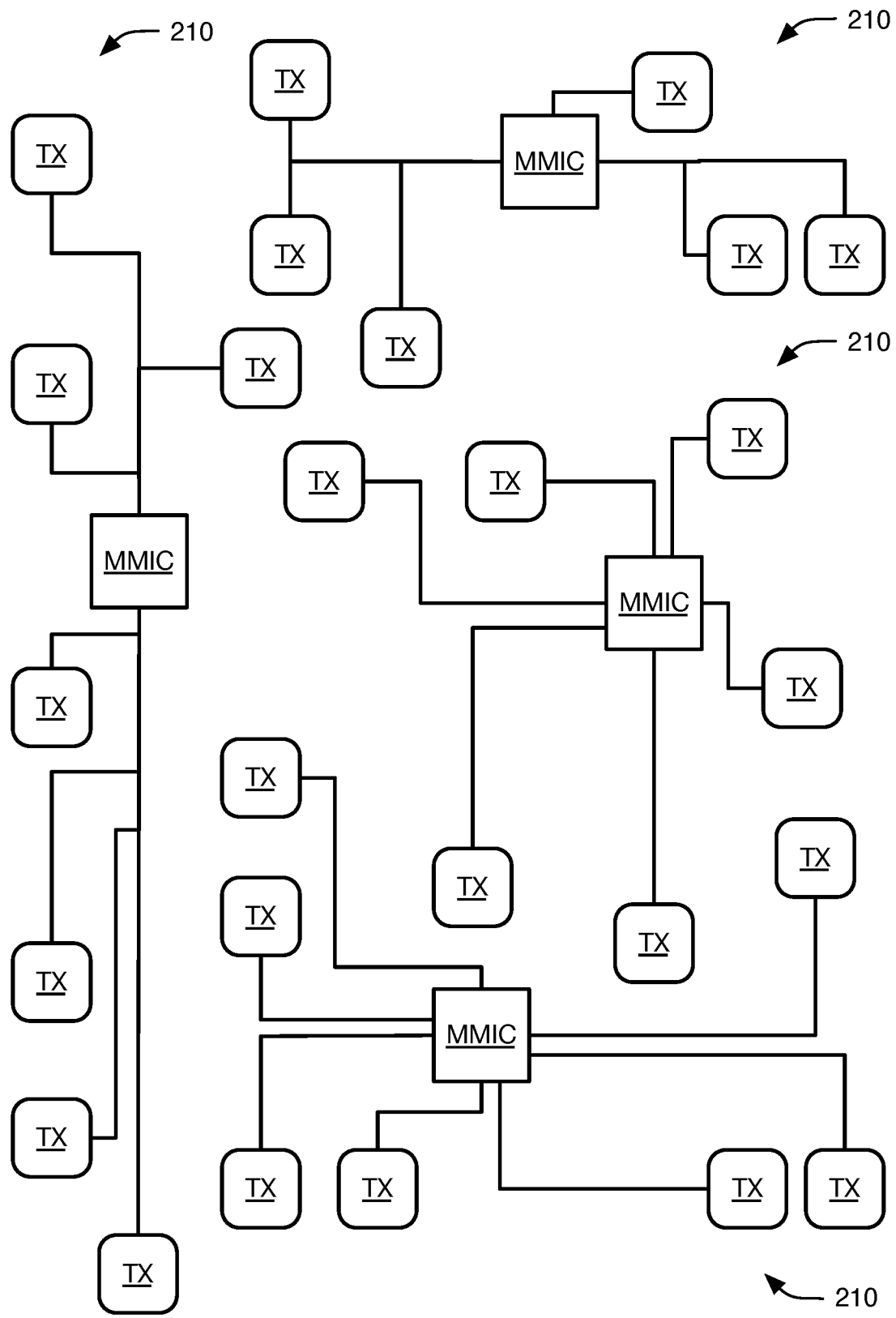

The system preferably includes multiple transmitter elements, more preferably including multiple transmitter arrays (e.g., wherein each transmitter array includes a different set of transmitter elements). The transmitter arrays (and/or any other suitable groupings of transmitter elements) are preferably independently controllable, wherein each independently controllable group of elements can preferably be operated separately and out of coherence with the other independently controllable groups. The system is preferably operable to switch between coherent and incoherent operation (and/or switch subsets of the transmitter elements between coherent and incoherent operation with respect to each other). In one embodiment, the system includes multiple transmitter arrays, each configured to be driven by a separate monolithic microwave integrated circuit (MMIC), such as shown by way of examples in FIGS. 3A-3B. For example, each MMIC can be configured to drive the transmitter elements of its associated transmitter array coherently (e.g., wherein each transmitter element of an array is driven in coherence with all other transmitter elements of the array), and can be operable to drive these elements in coherence with one or more other MMICs of the system (e.g., operable to switch between coherent and incoherent operation with respect to each of the other MMICs of the system, configurable to operate in coherence with any suitable subset of the other transmitter arrays, etc.).

In some examples, the different transmitter arrays (and/or any other suitable transmitter element groupings) may have different arrangements of transmitter elements as compared with other arrays. For example, a first array may have closely spaced and/or more numerous transmitter elements arranged along a first direction (e.g., azimuthal direction), but fewer and more sparsely spaced elements along a second direction (e.g., orthogonal to the first direction, such as an elevation direction), whereas a second transmitter array may have more numerous and/or closely spaced elements along the second direction, and fewer and/or more sparsely spaced elements along the first direction, such as shown by way of examples in FIGS. 3A-3B. However, the different transmitter arrays may alternatively have identical and/or more similar arrangements of transmitter elements. Further, the system can additionally or alternatively have any other suitable arrangement of transmitter elements and/or any other suitable elements.

The receiver array 220 preferably functions to receive reflections of the probe signal(s) transmitted by the transmitter 210. The receiver array 220 preferably determines phase, magnitude, and/or frequency information from reflected probe signals, but the receiver array 220 can additionally or alternatively determine any available characteristics of the reflected probe signals.

The receiver array 220 preferably includes a plurality of receiver elements 221 (e.g., receiver antennas), more preferably including a set of receiver elements 221 arranged in a pattern (e.g., along a horizontal or vertical axis, within a plane, etc.). The set of receiver elements 221 can include a single receiver paired to multiple antennas, such as antennas spaced in a particular pattern and/or with antennas coupled to phase shifters and/or time delays; multiple receivers, each paired to a single antenna; multiple receivers, some or all paired to multiple antennas (e.g., as described above regarding the single receiver), with the remaining receivers preferably each paired to a single antenna; and/or any other suitable receiver configurations.

In some embodiments (e.g., embodiments in which the system includes multiple transmitter arrays and/or embodiments in which the system includes only a single transmitter array and/or any other suitable arrangements of transmitter elements), the system can include multiple receiver arrays (e.g., wherein each receiver array includes a different set of receiver elements). The receiver arrays (and/or any other suitable groupings of receiver elements) are preferably independently controllable, wherein each independently controllable group of elements can preferably be operated separately and out of coherence with the other independently controllable groups. The system is preferably operable to switch between coherent and incoherent operation (and/or switch subsets of the receiver elements between coherent and incoherent operation with respect to each other). In one embodiment, the system includes multiple receiver arrays, each configured to deliver received signals to a separate monolithic microwave integrated circuit (MMIC), such as shown by way of examples in FIGS. 8A-8B. For example, each MMIC can be configured to receive signals from the receiver elements of its associated receiver array coherently (e.g., wherein signals are received from each receiver element of an array in coherence with all other receiver elements of the array), and can be operable to receive signals from these elements in coherence with one or more other MMICs of the system (e.g., operable to switch between coherent and incoherent operation with respect to each of the other MMICs of the system, configurable to operate in coherence with any suitable subset of the other receiver arrays, etc.).

In some examples, the different receiver arrays (and/or any other suitable receiver element groupings) may have different arrangements of receiver elements as compared with other arrays. For example, a first array may have closely spaced and/or more numerous receiver elements arranged along a first direction (e.g., azimuthal direction), but fewer and more sparsely spaced elements along a second direction (e.g., orthogonal to the first direction, such as an elevation direction), whereas a second receiver array may have more numerous and/or closely spaced elements along the second direction, and fewer and/or more sparsely spaced elements along the first direction, such as shown by way of examples in FIGS. 8A-8B. However, the different receiver arrays may alternatively have identical and/or more similar arrangements of receiver elements. Further, the system can additionally or alternatively have any other suitable arrangement of receiver elements and/or any other suitable elements.

For each array (e.g., each transmitter array 210 and/or each receiver array 220), some or all element pairs (e.g., pairs of transmitter antennas for the transmitter array, pairs of receiver antennas for the receiver array) preferably have a spacing substantially equal to (and/or less than) $\lambda/2$ (wherein $\lambda$ is the radio wavelength transmitted by the transmitters). This $\lambda/2$ spacing can be a spacing between physical elements, between a physical element and a virtual (e.g., VAA/MIMO) element, between virtual elements, and/or between any other suitable elements. In examples in which the array is multidimensional (e.g., planar, including both horizontal and vertical elements, etc.), the array preferably includes, for each dimension of the array (e.g., for a planar array, horizontal and vertical), one or more element pairs with a $\lambda/2$ spacing along that dimension; such pairs are more preferably substantially aligned along the other dimension(s), but can additionally or alternatively include pairs with a $\lambda/2$ spacing along multiple dimensions and/or with any other suitable spacing along the other dimension(s). However, the arrays can additionally or alternatively include elements with any other suitable spacing. The elements of some or all of the arrays can be arranged in linear (or substantially linear) arrangements, arranged in planar (or substantially planar) arrangements, arranged substantially along a surface (e.g., cylindrical surface, spherical surface, conical surface, etc.), arranged throughout a volume, and/or have any other suitable arrangement. The transmitter and receiver arrays (and/or aspects thereof, such as primary axes, etc.) can be arranged linearly, orthogonally, parallel, at oblique angles, skew, co-planar, and/or have any suitable arrangement relative to each other.

The arrangement of the transmitter and receiver arrays (e.g., direction and/or distance between the different transmitters and/or receivers) is preferably known. The arrangement is preferably fixed (or substantially fixed), such as wherein the transmitters and receivers of the arrays are rigidly coupled to each other. However, the arrangement can alternatively be changeable and/or changing. In some embodiments, different sets of receivers can be associated with each transmitter. The sets can be overlapping sets, disjoint sets, or have any other suitable relationship. In some such embodiments, the different sets of receivers can move independently from each other (e.g., wherein the arrangement of receivers within a set is fixed, but the arrangement of the different sets with respect to one another can vary). However, the transmitters and/or receivers can additionally or alternatively define any other suitable spatial arrangements.

The signal processor 240 preferably functions to analyze information received from other elements of the system 200, such as information determined, sampled, and/or otherwise collected by the transmitter array 210, receiver array 220, and/or velocity sensing module 250. The signal processor can additionally or alternatively function to control configuration and/or operation of one or more elements of the system 200. In examples, the signal processor 240 can: control determination of sets of array groupings (e.g., as described below regarding S111), control transmission of probe signals (e.g., as described below regarding S110, such as regarding S112), control receipt of probe signals (e.g., as described below regarding S120), decode and/or store received probe signals (e.g., as described below regarding S130), track environmental targets (e.g., as described below regarding S160), perform any other suitable elements described below regarding the method 100, and/or perform any other suitable functions (e.g., any other computing and/or processing functions).

The signal processor 240 preferably includes a one or more processors (e.g., CPU, GPU, microprocessor, microcontroller, FPGA, ASIC, etc.) and/or storage units (e.g., Flash, RAM, magnetic disk drive, etc.), but can additionally or alternatively include any other suitable elements. However, the signal processor 240 can additionally or alternatively perform its functions in any other suitable manner. The signal processor 240 can additionally or alternatively be used to communicate with an external computer (e.g., to offload computations, receive additional data, and/or for any other suitable reason). However, the system 200 can additionally or alternatively include any other suitable signal processor(s) 240.

The velocity sensing module 250 preferably functions to determine (e.g., measure, estimate, receive information indicative of, etc.) the velocity ("egovelocity") of the system 200 (and/or of one or more elements of the system 200, such as the transmitter and/or receiver arrays; and/or one or more objects coupled to the system 200; etc.). In some embodiments, the velocity sensing module includes and/or receives information indicative of velocity from one or more sensors (e.g., wherein the velocity sensing module includes one or more communications interfaces that receive information from the sensor(s)). The sensors can include spatial sensors (e.g., inertial measurement sensors, accelerometer, gyroscope, altimeter, magnetometer, etc.), location sensors (e.g., GNSS and/or other geopositioning modules, such as receivers for one or more of GPS, GLONASS, BeiDou, Galileo, etc.; local positioning modules, such as modules enabling techniques such as triangulation, trilateration, multilateration, etc.), speed sensors (e.g., pitot probes, wheel speed sensors, etc.), and/or any other suitable sensors. The communications interfaces can include Wi-Fi, Bluetooth, Ethernet, ODB-II, CAN bus, and/or any other suitable wired and/or wireless communication interfaces.

Some or all elements of the system 200 can include one or more aspects (e.g., sub-elements, configurations, functionalities, arrangements, etc.) such as described in U.S. patent application Ser. No. 16/704,409, filed 5 Dec. 2019 and titled "Systems and Methods for Interpolated Virtual Aperture Radar Tracking", which is herein incorporated in its entirety by this reference. However, the system 200 can additionally or alternatively include any other suitable elements in any suitable arrangement.

4. Method.

As described above, the method 100 preferably includes: transmitting probe signals S110, receiving reflected probe signals S120, and/or tracking environmental targets S160 (e.g., as shown in FIG. 1). The method can additionally or alternatively include decoding the set of received probe signals S130 and/or any other suitable elements.

4.1 Transmitting Probe Signals.

Transmitting probe signals S110 preferably includes determining a set of array groupings S111 and transmitting based on the set of array groupings S112. Transmitting probe signals preferably functions to transmit signals that, after reflection off of one or more targets, can provide information about those targets (e.g., relative location and/or velocity, etc.). S110 is preferably performed by the system described above (e.g., by some or all of the transmitter elements thereof), but can additionally or alternatively be performed by any other suitable systems.

4.1.1 Determining Array Groupings.

Determining a set of array groupings S111 preferably functions to group the transmitter arrays that will transmit probe signals in coherence with each other. These groupings are described herein as array groupings, in which the transmitter arrays are grouped, but a person of skill in the art will recognize that S111 can additionally or alternatively be performed to determine groupings of individual transmitter elements (and/or any other suitable sets thereof) in an analogous manner.

Sin can include determining any suitable array groupings 51. The array groupings of a set 50 are preferably disjoint, more preferably wherein the set of array groupings partitions the transmitter arrays; that is, for a set of array groupings, each transmitter array (or alternatively, each transmitter element) preferably belongs no more than one array grouping of that set, and more preferably belongs to exactly one array grouping of that set.

Figure 5A:
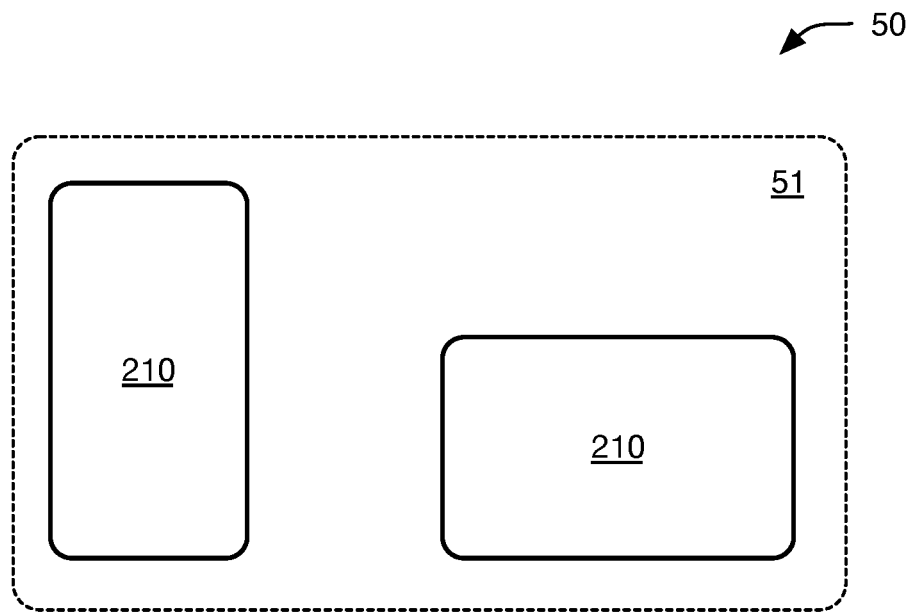

In a first example, the set of array groupings includes only a single grouping, preferably a grouping that includes all transmitter arrays of the system, such as shown by way of examples in FIGS. 5A and/or 6A.

Figure 5B:
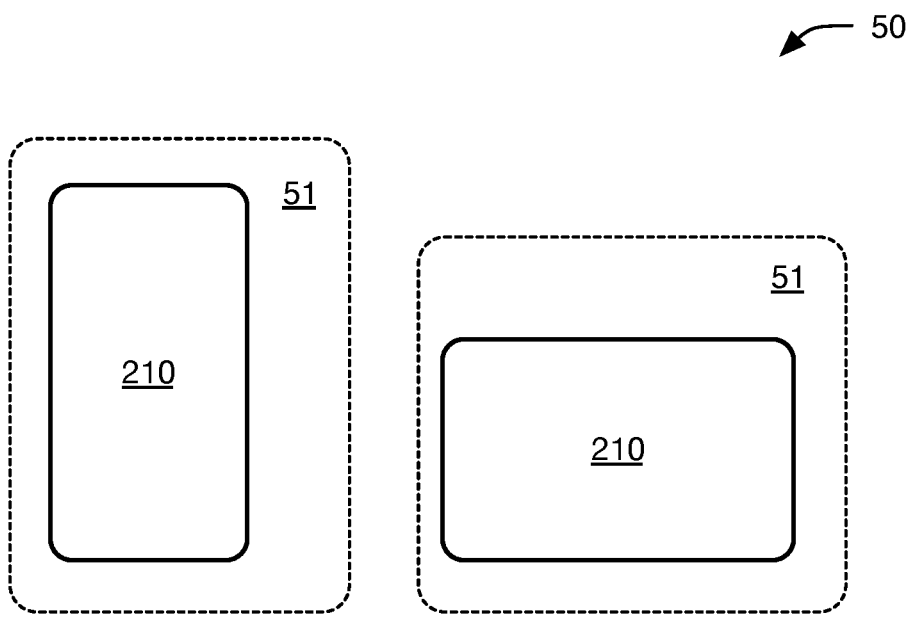
Figure 6A:
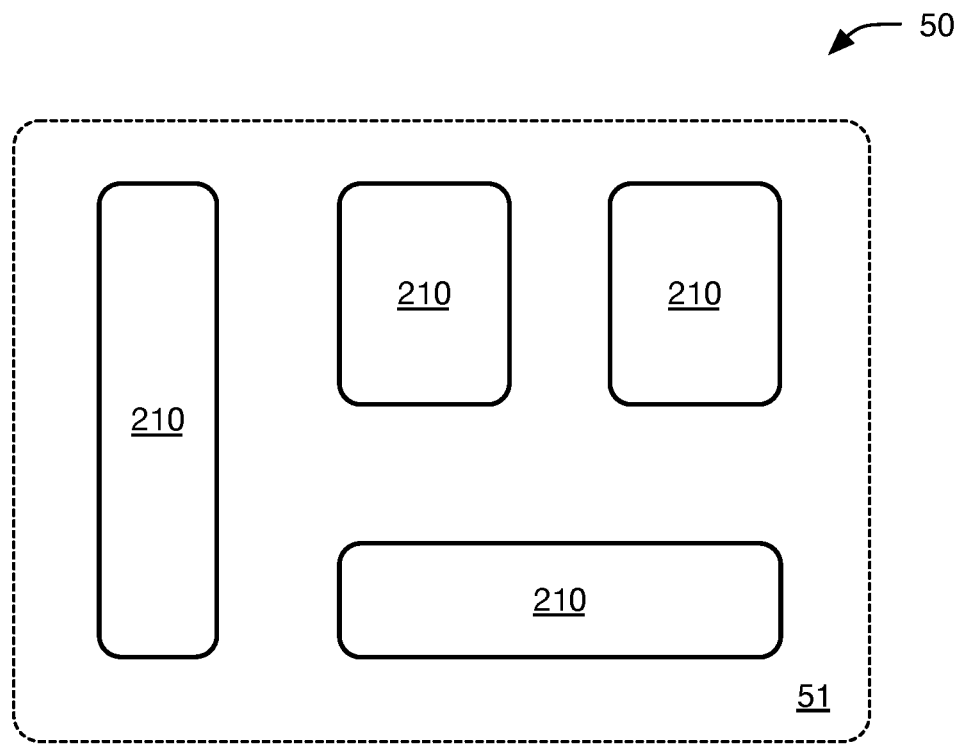
Figure 6B:
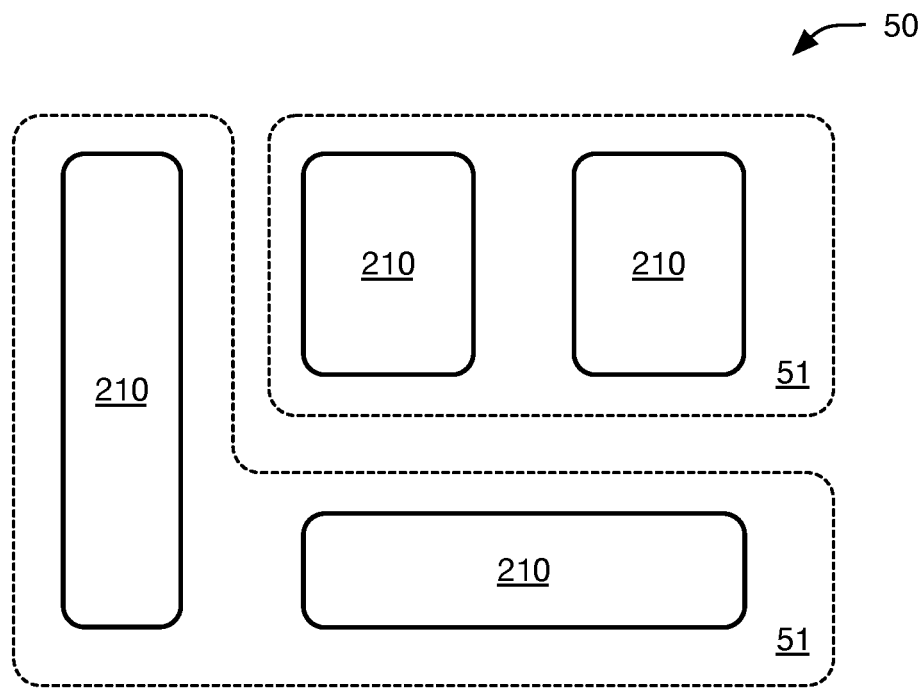
Figure 6C:
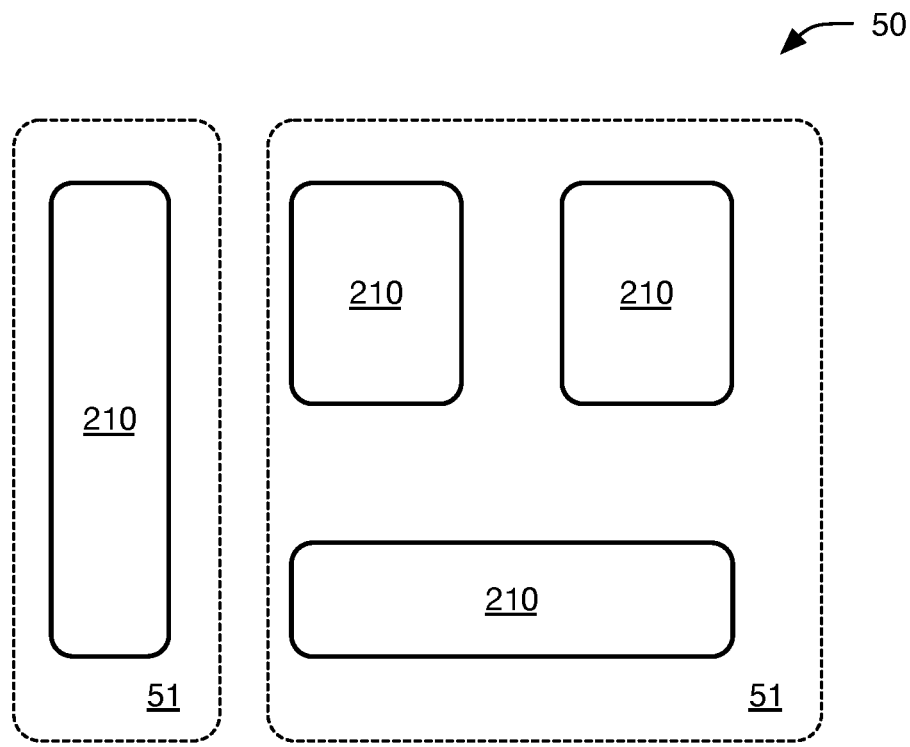
Figure 6D:
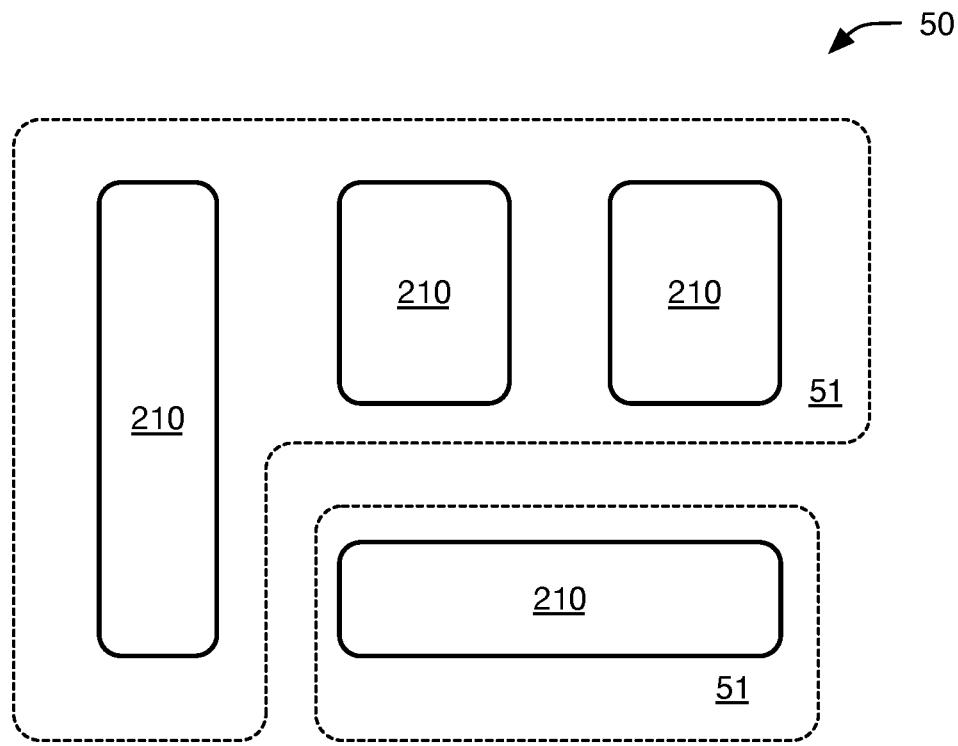

In a second example, the set of array groupings includes two groupings. In a first specific example, each of the two groupings includes a different half of the transmitter arrays, such as shown by way of examples in FIGS. 5B and/or 6B. In a second specific example, one of the groupings includes a single transmitter array, and the second grouping includes a plurality of transmitter arrays (e.g., all other transmitter arrays of the system), such as shown by way of examples in FIGS. 6C-6D.

Figure 6E:
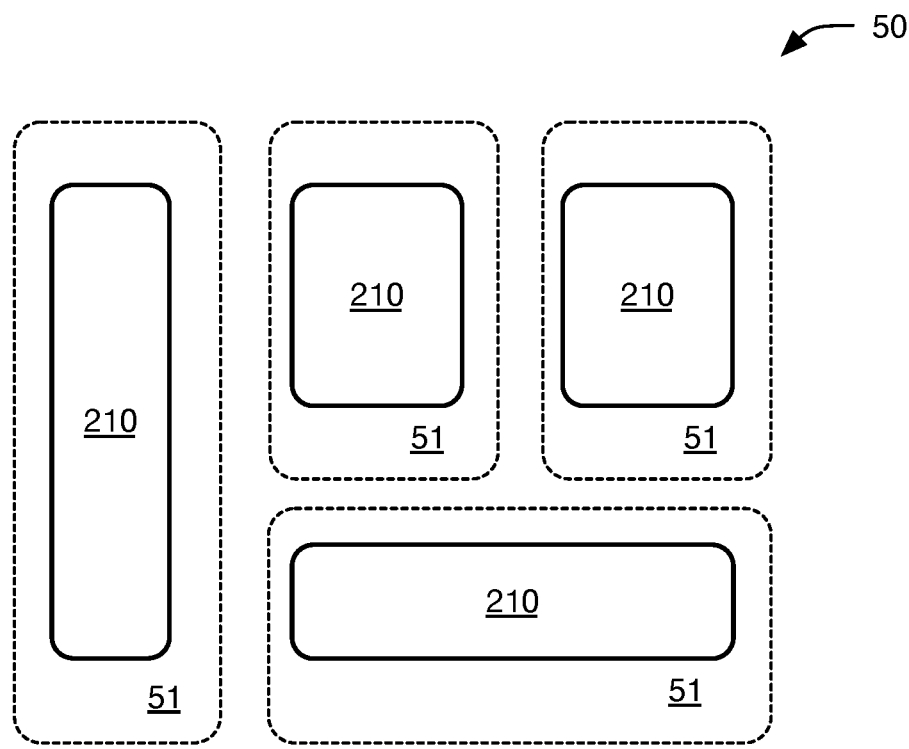
Figure 6F:
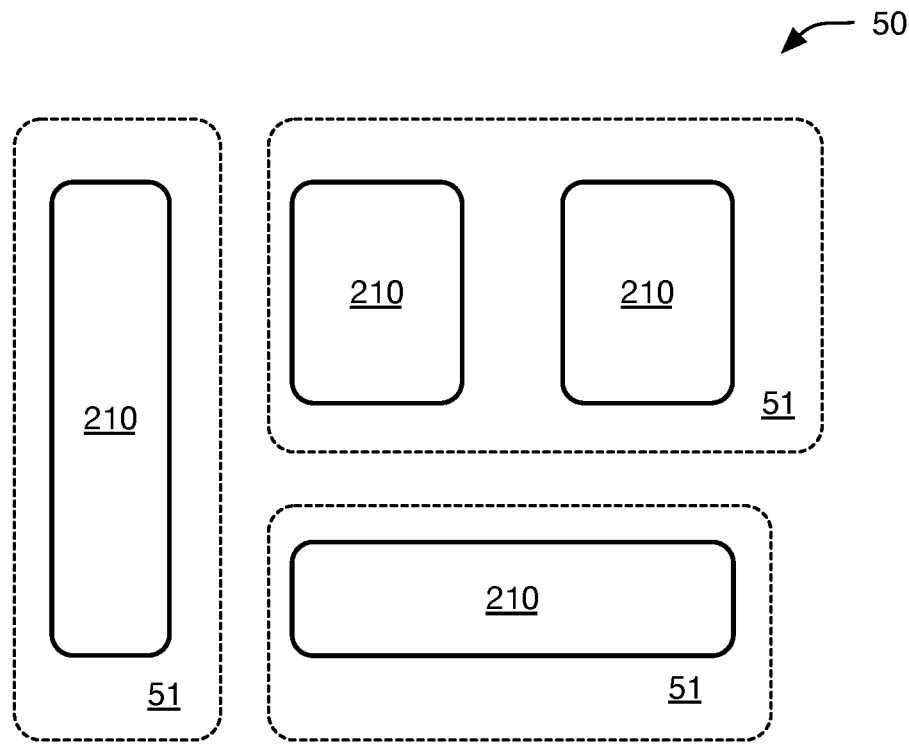

In a third example, the set of array groupings includes three or more groupings. In a first specific example, the set of array groupings includes a separate grouping for each transmitter array (wherein each grouping includes only a single transmitter array), such as shown by way of example in FIG. 6E. In a second specific example, the set of array groupings includes a first grouping with a first transmitter array, a second grouping with a second transmitter array, and a third grouping including a third and fourth transmitter array, such as shown by way of example in FIG. 6F.

However, S111 can additionally or alternatively include determining any other suitable array groupings and/or determining a set having any other suitable number of array groupings.

The set of array groupings can be determined based on a predetermined progression (e.g., progressing from the set of array groupings used for the previous frame to the next set of array groupings in the predetermined progression, such as progressing from a single array grouping, to a set of two array groupings, back to a single array grouping, and so on, or alternatively, progressing from a single array grouping, to a set of two array groupings, to a set of three array groupings, back to a single array grouping, and so on), can be dynamically determined (e.g., based on the targets being tracked, based on detection performance achieved by previous frames and/or previous uses of particular sets of array groupings, etc.), and/or can be determined in any other suitable manner.

Although described herein with respect to transmitter array groupings, a person of skill in the art will recognize that the set of array groupings can additionally or alternatively include one or more receiver array groupings 51', and/or that S111 (and/or any other suitable elements of the method) can additionally or alternatively include determining a set 50' of receiver array groupings, wherein the set of receiver array groupings (and the receiver array groupings thereof) are preferably analogous to the set of array groupings (and the transmitter arrays thereof) described herein. Analogous to the groupings of transmitter arrays described herein, the receiver array groupings can include one or more receiver arrays, wherein each receiver array of a receiver array grouping is preferably configured to operate coherently with the other receiver arrays of the grouping (e.g., and out of coherence with the receiver arrays of other groupings). Examples of such receiver array groupings (and sets thereof) are shown in FIGS. 9A-9B and 10A-10F.

However, S111 can additionally or alternatively include determining any other set of array groupings in any suitable manner.

4.1.2 Transmitting Based on Array Groupings.

Transmitting based on array groupings S112 preferably functions to enable detection and/or tracking of one or more targets in the environment surrounding the system, while exploiting the array groupings determined in S111 to enable enhancement of information that can be determined about these targets.

S12 preferably includes transmitting frequency shift keyed (FSK) RADAR signals and/or frequency-modified continuous wave (FMCW) RADAR signals (e.g., defining a plurality of "chirps"). The transmitted signals can optionally be encoded, such as using phase-based encodings and/or temporal encodings. However, S112 can additionally or alternatively include transmitting any other suitable signals. In examples, the signals can include electromagnetic signals (e.g., radio waves in RADAR; infrared, visible, and/or UV light in LIDAR; etc.) and/or sound signals (e.g., as in SONAR). In some embodiments, one or more elements of S112 are performed such as described in U.S. patent application Ser. No. 16/704,409, filed 5 Dec. 2019 and titled "SYSTEMS AND METHODS FOR INTERPOLATED VIRTUAL APERTURE RADAR TRACKING", U.S. patent application Ser. No. 17/125,122, filed 17 Dec. 2020 and titled "SYSTEMS AND METHODS FOR PHASE-MODULATED RADAR DETECTION", U.S. patent application Ser. No. 17/117,960, filed 10 Dec. 2020 and titled "SYSTEMS AND METHODS FOR VIRTUAL DOPPLER AND/OR APERTURE ENHANCEMENT", and/or U.S. patent application Ser. No. 17/670,330, filed 11 Feb. 2022 and titled "SYSTEM AND METHOD FOR RADAR INTERFERENCE MITIGATION", each of which is herein incorporated in its entirety by this reference (e.g., as described therein regarding 'transmitting a set of probe signals S110').

S112 preferably includes imposing phase variance on some or all of the transmissions, such as described elsewhere in more detail (e.g., regarding the phase modulation encoding and/or the additional phase variance). However, the transmissions can alternatively exhibit no (or substantially no) phase variance.

Figure 4A:
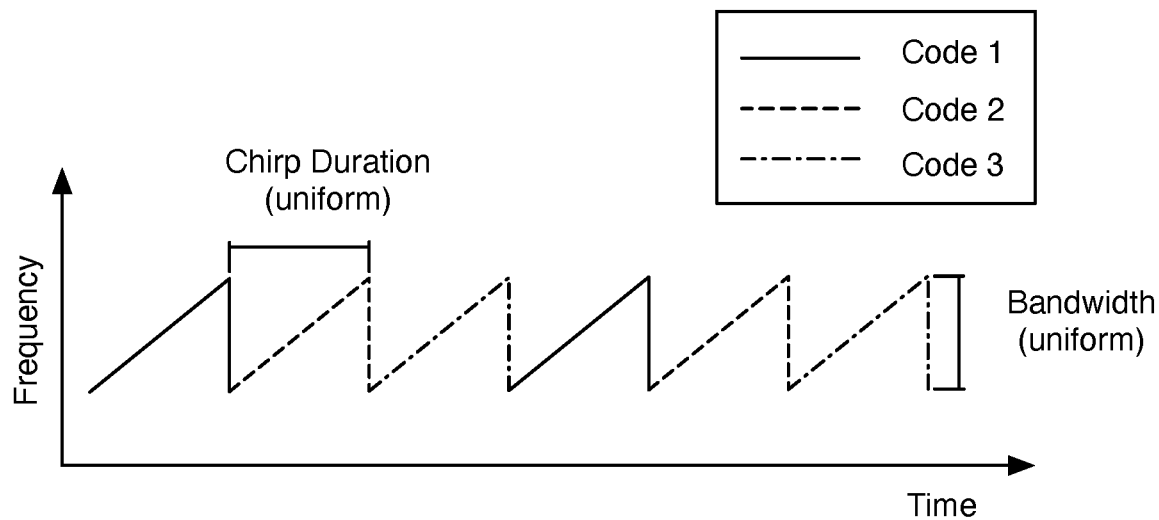
FIGS. 4A-4B are schematic representations of a first and second example of chirp profiles, respectively.
Figure 4B:
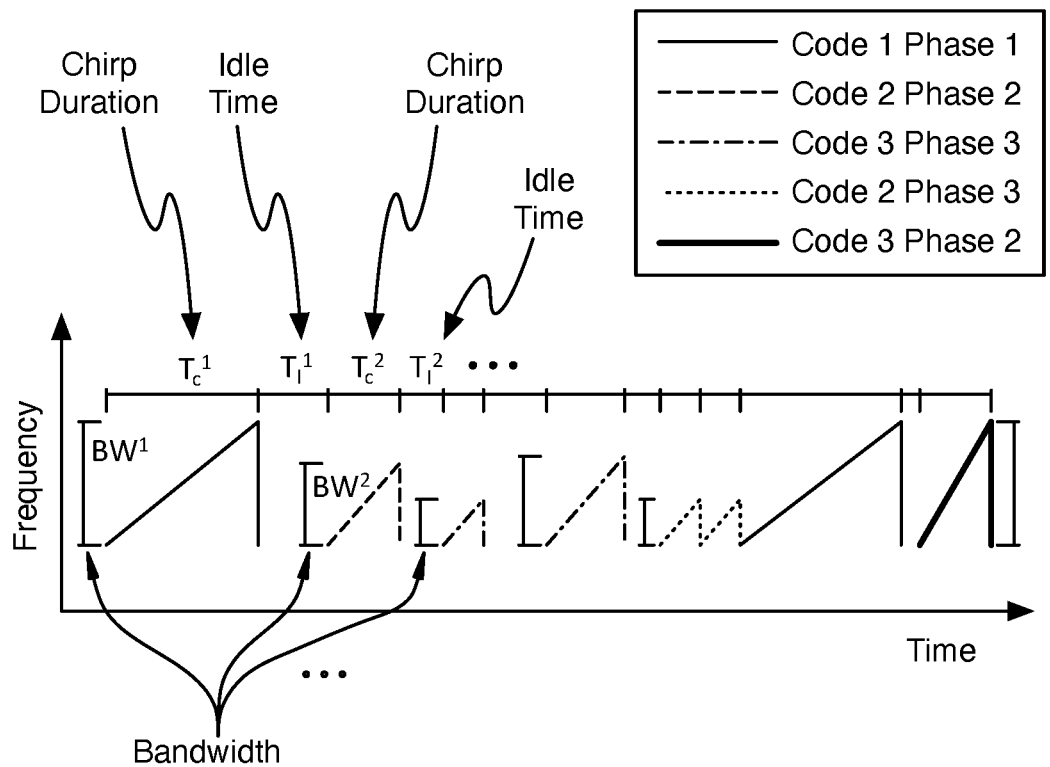

For example S112 can include transmitting probe signals defining a variety of signal characteristics, such as bandwidth, slope, phase, and/or any other suitable modulation. A specific example of chirps exhibiting varying idle times, bandwidths, slopes, and phase shifts is shown in FIG. 4B; although depicted herein with 3 different phase encodings and 3 different additional phase variances, a person of skill in the art will recognize that the chirps may additionally or alternatively exhibit any other suitable number of phase encodings, additional phase variances, and/or any other suitable aspects. In contrast, an example of chirps exhibiting substantially no idle times, and with substantially fixed bandwidths, slopes, and phase (optionally with the exception of phase modulation encoding to enable code-division multiplexing, e.g., wherein all transmitters transmit phase-encoded orthogonal chirps concurrently) is shown in FIG. 4A. However, the idle times, bandwidths, slopes, and/or phase shifts of the chirps can additionally or alternatively be controlled (e.g., varied) in any other suitable manner.

S112 preferably includes controlling each array grouping of a set (e.g., the set of array groupings determined in S111) to transmit concurrently (or substantially concurrently). However, S112 can additionally or alternatively include controlling the array groupings to transmit such that only a subset transmit concurrently, and/or to transmit with any other suitable timing. For each array grouping of the set, all transmitter elements (e.g., arrays, etc.) within the array grouping preferably transmit coherently with each other, more preferably wherein this transmission is not coherent with transmitter elements of the other array groupings of the set. For example, S112 can include, for each array grouping of the set, selecting a different waveform and controlling the transmitter elements of the array grouping to transmit based on that waveform. However, the transmitter elements can additionally or alternatively transmit with any other suitable coherency (or lack thereof).

In some embodiments, the different array groupings (e.g., of the set, of different sets, such as for different iterations of S110, etc.) can optionally transmit waveforms optimized for different purposes from each other (and/or waveforms optimized for the same and/or similar purposes).

In a first such embodiment, S112 can include transmitting a first waveform with longer-duration chirps (e.g., corresponding to larger bandwidth), which may be optimized for range resolution and/or high signal-to-noise ratio (SNR). Further, in this embodiment, S112 can include transmitting a second waveform with shorter-duration chirps (e.g., having a smaller bandwidth), which may be optimized for Doppler performance, such as resulting in an increased maximum radial velocity ($V_{max}$) that does not result in Doppler aliasing. In this embodiment, the first waveform is preferably transmitted by one or more elements of a first array grouping, and the second waveform can be transmitted (e.g., concurrently, and/or substantially concurrently, with transmission of the first waveform, at a different time from transmission of the first waveform, such as in a proceeding or subsequent frame, etc.) by one or more elements of a second array grouping.

In a second such embodiment, S112 can include transmitting multiple waveforms, each with longer-duration chirps (e.g., corresponding to larger bandwidth), which may be optimized for range resolution and/or high SNR. These multiple waveforms can be transmitted from different array groupings (e.g., concurrently, at different times, such as in temporally adjacent or nearby frames, etc.). These multiple waveforms are preferably configured such that they can be used together to improve Doppler performance as compared with the performance of any one of the waveforms on its own (e.g., enabling disambiguation between possible radial velocities corresponding to potential Doppler aliasing, such as at radial velocities exceeding the maximum radial velocity associated with one or more of these waveforms). For example, each waveform is associated with a (e.g., gives rise to) a particular value of $V_{max}$, and so, by using waveforms associated with different values of $V_{max}$ (e.g., $V_{max,1}$ associated with a first waveform, $V_{max,2}$ associated with a second waveform, etc.), this disambiguation can result in an effective joint $V_{max,j}$ equal to the least common multiple of the two individual $V_{max}$ values (in an example in which two waveforms are used in this manner): $V_{max,j}=\text{lcm}(V_{max,1}, V_{max,2})$. Thus, these waveforms are preferably configured such that the effective joint $V_{max,j}$ (e.g., the least common multiple of the individual-waveform $V_{max}$ values) is high, such as by selecting waveforms associated with $V_{max}$ values that are close or equal to different prime numbers and/or that are coprime with each other.

In this embodiment, the joint Doppler disambiguation can be achieved based on knowledge that the Doppler aliasing will result in indicated radial velocity values that differ from the true value by an integer multiple of Vmax. Accordingly, the true radial velocity $V_r = V_1 + n\ V_{max,1} = V_2 + m\ V_{max,2}$, where $V_1$ and $V_2$ are the radial velocity values indicated based on the first and second waveforms, respectively, $V_{max,1}$ and $V_{max,2}$ are the maximum radial velocities associated with the first and second waveforms, respectively, and n and m are integers; as some uncertainty will be present in the measurements that result in the values $V_1$ and $V_2$, a person of skill in the art will recognize that this may not result in a true equality, but rather that the equations above will be true for some values $V_1^*$ and $V_2^*$ (substituted in place of $V_1$ and $V_2$, respectively), wherein, for any i (e.g., for i $\in\{1,2\}$), $V_i^*$ is close to the value $V_i$ (e.g., within the range of possible or likely ground-truth values that could lead to the measurement indicative of the value $V_i$). In examples in which more than two waveforms are used for this joint disambiguation (e.g., more than two waveforms transmitted concurrently and/or close to each other in time), a person of skill in the art will recognize that this set of equations can be extended analogously to treat any suitable number of waveforms.

However, S112 can additionally or alternatively include transmitting any other suitable waveforms in any suitable manner.

4.1.3 Timing and Repetition.

The method preferably includes performing S110 repeatedly (e.g., continuously for a threshold number of transmissions, such as a threshold number of frames transmitted and/or a threshold number of sets of array groupings, etc.). For example, the method can include transmitting one or more frames (e.g., as described above regarding S112) based on a first set of array groupings (e.g., determined such as described above regarding Sin), then repeating S110 using a different set of array groupings (e.g., determined in a new iteration of S111) to transmit one or more additional frames (e.g., transmitted in a new iteration of S112), and so on for as many iterations of S110 as are desired.

In one example, the method can include performing a first iteration of S110, in which transmission is performed using a single array grouping (e.g., that includes all transmitter elements of the system). That is, S111 includes determining a set of array groupings, including only the single array grouping, and S112 includes transmitting based on that set. In this example, a second iteration of S110 can include transmitting using a set of more than one array grouping. In a first specific example, this can include two array groupings (e.g., each including half, or substantially half, of the transmitter arrays or transmitter elements of the transmitter, such as each including one MMIC and the associated transmitter elements in an example in which the system includes two MMICs each associated with a different transmitter array). In a second specific example, in which the transmitter includes more than two independently controllable sets of elements (e.g., more than two MMICs), this can additionally or alternatively include transmitting using a set of three or more array groupings. In this example, additional iterations of S110 can be performed using the single array grouping, using the same and/or different sets of multiple array groupings, and/or using any other suitable array groupings. In a specific example, the method can include alternating between performing S110 using a single array grouping and using a set of two array groupings, each including one MMIC.

In some examples, iterations of Sim can include selecting array groupings with complementary characteristics.

This can include complementary characteristics between different array groupings of a set. For example, one array grouping may be optimized for range resolution, whereas the other is optimized for Doppler performance. Additionally or alternatively, one array grouping may be optimized for elevation angle resolution, and another array grouping optimized for azimuthal angle resolution.

Additionally or alternatively, this can include selecting groupings with complementary characteristics between different sets of array groupings and/or between array groupings of different sets. For example, the best overall spatial resolution may be achieved from a set including only a single array grouping which includes all transmitter elements of the system, but transmissions with fewer (and/or lower-amplitude) grating lobes may be achieved by transmitting using array groupings with fewer and/or more densely-spaced elements. Accordingly, a grouping with a large number of elements (e.g., of all transmitter elements of the system) may be used close in time to (e.g., in the frame preceding and/or following, in one or more of a few frames preceding and/or following, within a threshold time interval, such as less than 5, 10, 15, 20, 30, 50, and/or 100 ms, etc.) a set of array groupings including one or more groupings with fewer and/or more densely-spaced transmitter elements.

Additionally or alternatively, S110 can optionally include performing interference mitigation (e.g., as described in U.S. patent application Ser. No. 17/670,330, filed 11 Feb. 2022 and titled "SYSTEM AND METHOD FOR RADAR INTERFERENCE MITIGATION", which is herein incorporated in its entirety by this reference). This interference mitigation can additionally or alternatively include selecting concurrent waveforms (waveforms to be transmitted concurrently or substantially concurrently, such as by different array groupings of a set) to eliminate or minimize parallel interference between each other and/or to avoid crossing interference between each other where practical (e.g., without compromising, or significantly compromising, other goals associated with selection of the concurrent waveforms). Further, where crossing interference (and/or parallel interference) does exist between the waveforms, additional iterations of S110 (e.g., performed nearby in time, such as in the preceding and/or following frame or frames) preferably include selecting alternate waveforms such that interference does not exist in analogous portions of the alternate waveforms (e.g., thereby enabling information lost due to interference to be reconstructed based on the alternate waveforms, such as described in more detail in U.S. patent application Ser. No. 17/670,330).

However, S110 can additionally or alternatively include transmitting probe signals in any other suitable manner and/or with any other suitable timing.

4.2 Receiving Reflected Probe Signals.

Receiving reflected probe signals S120 preferably functions to determine information associated with reflections (e.g., from targets in the environment) of the probe signals transmitted in S110. S120 preferably includes determining (e.g., measuring) phase, magnitude, and/or frequency information from reflected probe signals ("return signals" or "returns"), but S120 may additionally or alternatively include measuring any available characteristics of the returns. S120 preferably includes determining any data necessary to recover signal identification information (e.g., information for determining which signal, such as which signal of a signal group or of the transmitted set, the reflected probe signal corresponds to). S120 can optionally include phase shifting some or all of the received signals (e.g., using phase shift elements associated with the receivers), and/or processing the received signals in any other suitable manner.

S120 preferably includes storing some or all of the received signals (and/or derivatives of the received signals). The received signals can be stored at each receiver (e.g., storing signals received by that receiver), stored at a centralized storage element (e.g., associated with a computing element such as the signal processor 240), and/or stored in any other suitable location(s). The stored signals preferably include all signals of a signal group or of a frame (and can optionally include signals of multiple signal groups or frames). However, S120 can additionally or alternatively include storing any other suitable received signals in any suitable manner.

S120 is preferably performed substantially concurrently with S110 (e.g., such that the probe signals transmitted in S110 can be received after reflection off one or more targets in the environment). In some examples, S120 can be performed continuously, performed in response to performance of (e.g., beginning the performance of) S110, and/or with any other suitable timing and/or numerosity.

In examples in which a set of receiver array groupings is determined, S120 (and/or additional method elements performed based on the signals received in S120, such as S130 and/or S160) is preferably performed based on the set of receiver array groupings (e.g., in a manner analogous to performance of S112 based on the set of array groupings determined in S111).

However, S120 can additionally or alternatively include receiving the set of reflected probe signals in any other suitable manner.

4.3 Decoding Received Probe Signals.

The method can optionally include decoding the received probe signals S130. For example, S130 can be performed in embodiments in which the transmitted and/or received probe signals are encoded, such as using a phase encoding and/or temporal encoding. Decoding the set of received probe signals S130 can function to convert the received signals (e.g., encoded signals) into signals that can be used to determine information (e.g., relative position and/or velocity) about the targets off of which the signals were reflected.

S130 preferably includes one or more elements such as described in U.S. patent application Ser. No. 16/704,409, filed 5 Dec. 2019 and titled "SYSTEMS AND METHODS FOR INTERPOLATED VIRTUAL APERTURE RADAR TRACKING", U.S. patent application Ser. No. 17/125,122, filed 17 Dec. 2020 and titled "SYSTEMS AND METHODS FOR PHASE-MODULATED RADAR DETECTION", U.S. patent application Ser. No. 17/117,960, filed 10 Dec. 2020 and titled "SYSTEMS AND METHODS FOR VIRTUAL DOPPLER AND/OR APERTURE ENHANCEMENT", and/or U.S. patent application Ser. No. 17/670,330, filed 11 Feb. 2022 and titled "SYSTEM AND METHOD FOR RADAR INTERFERENCE MITIGATION", each of which is herein incorporated in its entirety by this reference (e.g., wherein S130 is performed such as described in U.S. patent application Ser. No. 17/125,122 regarding "decoding the set of received probe signals S130"). However, S130 can additionally or alternatively include decoding the set of received probe signals in any other suitable manner.

4.4 Tracking Environmental Targets.

Tracking environmental targets S160 preferably functions to determine and track the position and/or velocity of objects in the environment surrounding the radar system. S160 is preferably performed based on probe signals received as described above regarding S120 (and optionally decoded such as described above regarding S130), but can additionally or alternatively be performed based on any other suitable probe signals and/or any other suitable information of any kind.

In some examples, S160 can include determining tracking information, refining the determined tracking information, and/or modifying the operation of the radar system (e.g., modifying probe signal transmission, receipt, and/or processing) based on the tracking information (e.g., as described in U.S. patent application Ser. No. 16/704,409, filed 5 Dec. 2019 and titled "SYSTEMS AND METHODS FOR INTERPOLATED VIRTUAL APERTURE RADAR TRACKING", which is herein incorporated in its entirety by this reference, such as described in U.S. patent application Ser. No. 16/704,409 regarding 'calculating initial tracking parameters S130', 'refining the initial tracking parameters S140', and/or 'modifying probe signal characteristics S150', etc.). Additionally or alternatively, S160 can include determining information associated with radar system motion and/or determining localization and/or mapping information associated with the radar system and/or its environment (e.g., as described in U.S. patent application Ser. No. 17/527,596, filed 16 Nov. 2021 and titled "SYSTEM AND METHOD FOR RADAR-BASED LOCALIZATION AND/OR MAPPING", which is herein incorporated in its entirety by this reference).

S160 preferably includes determining and/or updating tracking data, which can optionally represent (and/or be indicative of) one or more time series. The data preferably includes data associated with tracking points (e.g., through the time series) in one or more dimensional spaces.

This tracking preferably includes point tracking in an R-V space, where R represents distance to a point (e.g., from the radar sensor) and V represents one or more velocities associated with that point. The one or more point velocities can be determined based on Doppler data for that point, wherein the velocity is preferably the radial velocity $V_D$ of the point (e.g., relative to the radar sensor), but can additionally or alternatively include one or more derivative velocity values and/or any other suitable velocity.

The sensor data can additionally or alternatively include point tracking in position space (relative to the sensor), such as represented by position in spherical coordinates (e.g., radial distance R, polar angle $\theta$, and azimuthal angle $\phi$) and/or any other suitable coordinate system, point tracking in angular position space (relative to the sensor), such as represented by elevation and azimuth, and/or tracked in any other suitable spaces.

In some embodiments, S160 can include updating a set of tracked targets based on received probe signals. For example, S160 can include determining matches between the received probe signals and targets tracked in an R-V space (e.g., and updating R-V information associated with the tracked targets accordingly), and determining matches between the received probe signals and targets tracked in an angular position space (e.g., and updating angular position information associated with the tracked targets accordingly). Preferably, matching is performed first in the R-V space and subsequently in the angular position space. However, matching can additionally or alternatively be performed in any other suitable order and/or in any other suitable manner.

S160 preferably includes cross-checking between information associated with (e.g., derived from) different sets of coherent transmissions (e.g., transmissions from different array groupings). These different sets of coherent transmissions can be transmitted by different array groupings of a set (e.g., transmitted concurrently, or substantially concurrently), by array groupings of different sets (e.g., transmitted consecutively, close to each other in time, and/or with any other suitable relative timing; transmitted during different iterations of S110, such as consecutive iterations of S110, etc.), can be transmitted by the same array groupings but at different times (e.g., transmitted during different iterations of S110), and/or can be transmitted in any other suitable manner.

Concurrent (and/or substantially concurrent) transmissions, such as incoherent transmissions made concurrently from different array groupings of a set, are known to provide information about the environment in a substantially identical state to each other. Transmissions made close to each other in time (e.g., during consecutive frames) are likely to provide information about the environment in an unchanged or mostly unchanged state, due to the relatively small amount of time elapsed between the transmissions (e.g., on the order of single milliseconds or tens of milliseconds, such as corresponding to one or a few frames, wherein each frame has a duration less than 10 ms). In some circumstances, transmissions made farther apart in time may also be relied on to provide information about the environment in a mostly unchanged state (e.g., if the system and/or objects in the environment are substantially stationary or moving at relatively low speed).

In contrast, in other circumstances, transmissions made farther apart in time may not be useful for cross-checking (e.g., if the system and/or objects in the environment are moving more rapidly). As the environment surrounding the system may have changed substantially between these different transmissions, in some examples, it may not be desirable to rely on cross-checking between information derived from these different transmissions, as the cross checks typically rely on an assumption that the data that can arise from the transmissions (e.g., data determined based on reflections of the transmissions, received in S120) is indicative of a relatively unchanged environmental state.

However, S160 can additionally or alternatively include cross-checking between any other suitable sets of information.

In some embodiments, this cross-checking can be used to discriminate between a real return, corresponding to a real object in the environment, and noise. A real return, generated by reflection of the probe signals off an object in the environment, would be expected to be present in most or all of the cross-checked data, having consistent or substantially consistent parameters (e.g., range, radial velocity, angular position, etc.) across the different data sets. In contrast, an identified return produced by noise (rather than by reflection off an object in the environment) will typically be represented with a particular set of parameters in only one (or, at most, a few) sets of returns (e.g., corresponding to returns received in association with a single set of transmitted probe signals), rather than appearing with substantially consistent parameters in most or all of the data. Accordingly, S160 can include identifying the returns present with substantially consistent parameters in most or all of the data as real returns, and/or filtering out returns that are not present with substantially consistent parameters in most or all of the data (e.g., appearing in only one or only a few of the returns).

This cross-checking can additionally or alternatively include refining information determined about the returns (e.g., refining determinations of return parameters, such as range, radial velocity, angular position, etc.). In one example, a first set of returns may correspond to high range resolution but poor radial velocity resolution, whereas a second set of returns may correspond to high radial velocity resolution but poor range resolution. Accordingly, a first return from the first set will typically be indicative of a range value with only a small amount of uncertainty, but will typically be indicative of a band of likely radial velocities (rather than a single radial velocity value known with only a small amount of uncertainty). Similarly, a second return from the second set will typically be indicative of a radial velocity value with only a small amount of uncertainty, but will typically be indicative of a band of likely ranges (rather than a single range value known with only a small amount of uncertainty). If the range value indicated by the first return is consistent with (e.g., lies within) the band of likely ranges indicated by the second return, and the radial velocity value indicated by the second return is consistent with (e.g., lies within) the band of likely radial velocities indicated by the first return, then the first and second return likely represent reflection from the same object in the environment. Accordingly, the information from these two returns can be combined to determine refined tracking parameters in the R-V space, and this object can be tracked in association with both the high-certainty range value indicated by the first return and the high-certainty radial velocity value indicated by the second return. Analogously, this same process could be carried out for determining refined tracking parameters in the angular position space, based on a pair of sets of returns, one having superior azimuthal resolution and the other having superior elevation angle resolution (e.g., as shown in FIG. 7), and/or for any other suitable complementary sets of returns.

In some embodiments, S160 can optionally include performing one or more Doppler-based corrections (e.g., as described in U.S. patent application Ser. No. 17/328,693, filed 24 May 2021 and titled "SYSTEMS AND METHODS FOR VIRTUAL DOPPLER AND/OR APERTURE ENHANCEMENT", which is herein incorporated in its entirety by this reference). Additionally or alternatively, these corrections can include using different sets of coherent transmissions (e.g., from different array groupings, such as those used concurrently, consecutively, and/or with any other suitable relative timing) for further disambiguation between different possible radial velocities (e.g., as described above in more detail regarding S112).

However, S160 can additionally or alternatively include tracking environmental targets in any other suitable manner. Further, the method can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for radar tracking, comprising, at a radar system comprising a plurality of transmitter elements and a set of receive elements:
   selecting, from the plurality of transmitter elements, a first set of transmitter elements and a second set of transmitter elements, wherein the first and second sets of transmitter elements are disjoint;
   based on the first set of transmitter elements, selecting a first radar waveform;
   based on the second set of transmitter elements, selecting a second radar waveform;

during a first time interval, at the first set of transmitter elements, coherently transmitting a first set of probe signals based on the first radar waveform;

during the first time interval, concurrent with coherently transmitting the first set of probe signals, at the second set of transmitter elements, coherently transmitting a second set of probe signals based on the second radar waveform, wherein, during the first time interval, the first set of transmitter elements does not transmit in coherence with the second set of transmitter elements;

in response to generation of a first set of reflected signals via reflection of the first and second sets of probe signals by a set of targets in an environment surrounding a radar array, at the set of receive elements, receiving the first set of reflected signals;

demultiplexing the first set of reflected signals to generate a first set of returns associated with the first radar waveform and a second set of returns associated with the second radar waveform;

based on the first set of returns, determining a first presumptive characteristic value associated with a target of the set;

based on the second set of returns, determining a second presumptive characteristic value associated with the target; and based on the first and second presumptive characteristic values, determining a refined characteristic value associated with the target.

2. The method of claim 1, further comprising:

based on a third set of transmitter elements, selecting a third radar waveform, wherein the third set of transmitter elements comprises the first and second sets of transmitter elements;

during a second time interval, at the third set of transmitter elements, coherently transmitting a third set of probe signals based on the third radar waveform;

in response to generation of a second set of reflected signals via reflection of the third set of probe signals by the set of targets, at the set of receive elements, receiving the second set of reflected signals;

generating, based on the second set of reflected signals, a third set of returns associated with the third radar waveform; and based on the third set of returns, determining a third presumptive characteristic value associated with the target, wherein determining the refined characteristic is performed based further on the third presumptive characteristic value.

3. The method of claim 2, further comprising:

assessing a possible target, comprising determining that:
the first set of returns is indicative of presence of the possible target within a first region of a radar tracking space;
the second set of returns is not indicative of presence of the possible target within the first region; and
the third set of returns is not indicative of presence of the possible target within the first region; and based on assessing the possible target, determining that the possible target is not present in the first region.

4. The method of claim 3, further comprising determining that the possible target is not present in the environment.

5. The method of claim 3, wherein the radar tracking space is a range-radial velocity space.

6. The method of claim 2, further comprising:

selecting, from the plurality of transmitter elements, a fourth set of transmitter elements, wherein the third and fourth sets are disjoint;

based on the fourth set of transmitter elements, selecting a fourth radar waveform;

during the second time interval, concurrent with coherently transmitting the third set of probe signals, at the fourth set of transmitter elements, coherently transmitting a fourth set of probe signals based on the fourth radar waveform, wherein, during the second time interval, the third set of transmitter elements does not transmit in coherence with the fourth set of transmitter elements;

demultiplexing the second set of reflected signals to generate the third set of returns and a fourth set of returns associated with the fourth radar waveform; and based on the fourth set of returns, determining a fourth presumptive characteristic value associated with the target, wherein determining the refined characteristic is performed based further on the fourth presumptive characteristic value.

7. The method of claim 6, wherein:

the first set of transmitter elements comprises a first transmitter array, wherein the first transmitter array is configured to be controlled by a first monolithic microwave integrated circuit (MMIC);

coherently transmitting the first set of probe signals comprises, at the first MMIC, controlling the first transmitter array to transmit based on the first radar waveform;

the second set of transmitter elements comprises a second transmitter array, wherein the second transmitter array is configured to be controlled by a second MMIC;

coherently transmitting the second set of probe signals comprises, at the second MMIC, controlling the second transmitter array to transmit based on the second radar waveform;

the third set of transmitter elements comprises the first and second transmitter arrays;

coherently transmitting the third set of probe signals comprises:

at the first MMIC, controlling the first transmitter array to transmit based on the third radar waveform; and substantially concurrent with controlling the first transmitter array to transmit based on the third radar waveform, at the second MMIC, controlling the second transmitter array to transmit based on the third radar waveform;

the fourth set of transmitter elements comprises a third transmitter array, wherein the third transmitter array is configured to be controlled by a third MMIC; and coherently transmitting the fourth set of probe signals comprises, at the third MMIC, controlling the third transmitter array to transmit based on the fourth radar waveform.

8. The method of claim 7, wherein the fourth set of transmitter elements further comprises a fourth transmitter array configured to be controlled by a fourth MMIC; and wherein coherently transmitting the fourth set of probe signals further comprises, substantially concurrent with controlling the third transmitter array to transmit based on the fourth radar waveform, at the fourth MMIC, controlling the fourth transmitter array to transmit based on the fourth radar waveform.

9. The method of claim 8, further comprising:

based on the third transmitter array, selecting a fifth radar waveform;

based on the fourth transmitter array, selecting a sixth radar waveform; and during the first time interval, concurrent with coherently transmitting the first set of probe signals and with coherently transmitting the second set of probe signals:
at the third transmitter array, coherently transmitting based on the fifth radar waveform; and
at the fourth transmitter array, coherently transmitting based on the sixth radar waveform.

10. The method of claim 2, wherein the second radar waveform is selected based further on the first radar waveform.

11. The method of claim 10, wherein the third radar waveform is selected based further on the first and second radar waveforms.

12. The method of claim 1, wherein the second radar waveform is selected based further on the first radar waveform.

13. The method of claim 1, wherein the plurality of transmitter elements is partitioned by the first and second sets of transmitter elements.

14. The method of claim 1, wherein:
the first set of transmitter elements defines a first array elongated along a first axis; and
the second set of transmitter elements defines a second array elongated along a second axis, wherein the second axis is not substantially parallel to the first axis.

15. The method of claim 14, wherein the first axis is substantially normal to the second axis.

16. The method of claim 14, wherein:
the first and second presumptive characteristic values are elevation angle values;
the first set of returns is indicative of presence of the target within a first range of elevation angles spanning a first angular distance;
the second set of returns is indicative of presence of the target within a second range of elevation angles spanning a second angular distance greater than the first angular distance;
determining the refined characteristic value comprises selecting a value within the first range;
the method further comprising:
based on the first set of returns, determining a first presumptive azimuthal angle associated with the target, wherein the first set of returns is indicative of presence of the target within a third range of azimuthal angles spanning a third angular distance;
based on the second set of returns, determining a second presumptive azimuthal angle associated with the target, wherein the second set of returns is indicative of presence of the target within a fourth range of azimuthal angles spanning a fourth angular distance lesser than the third angular distance; and
based on the first and second presumptive azimuthal angles, determining a refined azimuthal angle, within the fourth range of azimuthal angles, associated with the target.

17. The method of claim 1, wherein:
the first radar waveform comprises a first set of chirps defining a first average chirp duration;
the second radar waveform comprises a second set of chirps defining a second average chirp duration substantially different from the first average chirp duration;
the first and second presumptive characteristic values are radial velocity values; and
the method further comprises, based on the first and second radar waveforms and the first and second presumptive characteristic values, determining a disambiguated radial velocity value associated with the target.

18. The method of claim 17, wherein:
the first set of chirps define a first maximum radial velocity;
the second set of chirps define a second maximum radial velocity;
the disambiguated radial velocity value is greater than the first maximum radial velocity and is greater than the second maximum radial velocity; and
determining the disambiguated radial velocity value is performed based on the first maximum radial velocity and the second maximum radial velocity.

19. The method of claim 18, wherein determining the disambiguated radial velocity value comprises:
adding an integer multiple of the first maximum radial velocity to the first presumptive characteristic value to generate a first possible radial velocity;
adding an integer multiple of the second maximum radial velocity to the second presumptive characteristic value to generate a second possible radial velocity substantially equal to the first possible radial velocity; and
based on the substantial equality of the first and second possible radial velocities, determining that the disambiguated radial velocity value is substantially equal to the first and second possible radial velocities.

20. The method of claim 17, wherein the second average chirp duration is substantially greater than the first average chirp duration, the method further comprising:
based on the first set of returns, determining a span of possible range values associated with the target;
based on the second set of returns, determining a presumptive range value associated with the target, wherein the presumptive range value lies within the span of possible range values; and
based on the presumptive range value lying within the span of possible range values, tracking the target in association with the disambiguated radial velocity value and the presumptive range value.

* * * * *